United States Patent [19]

Fukushima et al.

[11] 4,438,238

[45] Mar. 20, 1984

[54] LOW DENSITY COPOLYMER COMPOSITION OF TWO ETHYLENE-α-OLEFIN COPOLYMERS

[75] Inventors: Nobuo Fukushima, Ootsu; Shuji Kitamura, Ibaraki; Kiyohiko Nakae, Nishinomiya; Tadatoshi Ogawa, Takatsuki; Kozo Kotani; Hidekazu Hosono, both of Toyonaka, all of Japan

[73] Assignee: Sumitomo Chemical Company, Limited, Osaka, Japan

[21] Appl. No.: 342,428

[22] Filed: Jan. 25, 1982

[30] Foreign Application Priority Data

| Jan. 30, 1981 | [JP] | Japan | 56-14038 |
| Jan. 30, 1981 | [JP] | Japan | 56-14039 |
| Jan. 30, 1981 | [JP] | Japan | 56-14040 |
| Jan. 30, 1981 | [JP] | Japan | 56-14041 |
| Jan. 30, 1981 | [JP] | Japan | 56-14042 |
| Jan. 30, 1981 | [JP] | Japan | 56-14043 |
| Jan. 30, 1981 | [JP] | Japan | 56-14044 |

[51] Int. Cl.$^3$ .............. C08F 297/08; C08L 23/06; C08L 23/08

[52] U.S. Cl. .............. 525/240; 502/152; 264/176 R; 428/218; 428/220; 525/53; 525/247; 526/79; 526/346; 526/348.2; 526/348.4; 526/348.5; 526/348.6; 528/482

[58] Field of Search ............... 525/240

[56] References Cited

U.S. PATENT DOCUMENTS

| 3,914,342 | 10/1975 | Mitchell | 525/240 |
| 4,307,209 | 12/1981 | Morita et al. | 525/240 |
| 4,330,639 | 5/1982 | Matsuura et al. | 525/240 |
| 4,335,224 | 6/1982 | Matsuura et al. | 525/240 |

FOREIGN PATENT DOCUMENTS

| 22376A2 | 1/1981 | European Pat. Off. |
| 54-100444 | 8/1979 | Japan |
| 54-100445 | 8/1979 | Japan |

Primary Examiner—Stanford M. Levin
Attorney, Agent, or Firm—Stevens, Davis, Miller & Mosher

[57] ABSTRACT

An ethylene-α-olefin copolymer composition comprising two ethylene-α-olefin copolymers which are different in density, intrinsic viscosity and the number of short chain branching per 1000 carbon atoms. Extrusion processed materials, injection molded materials and films obtained from said composition are excellent in strength.

23 Claims, 9 Drawing Figures

LOW DENSITY COPOLYMER COMPOSITION OF TWO ETHYLENE-α-OLEFIN COPOLYMERS

The present invention relates to an ethylene-α-olefin copolymer composition. More particularly, the present invention relates to ethylene-α-olefin copolymer compositions excellent in processability, impact strength, tensile strength, environmental stress cracking resistance, low temperature resistance, creep characteristics, tear strength, transparency, heat-sealing characteristics and chemical characteristics such as chemicals resistance, which is obtained by mixing an ethylene-α-olefin copolymer of a relatively higher molecular weight and an ethylene-α-olefin copolymer of a relatively lower molecular weight.

Being excellent in melt rheology characteristics as well as in physical and chemical properties, low density polyethylenes manufactured by the high pressure method (hereinafter referred to as "high pressure polyethylene") have been used for various uses such as films, sheets, pipes, blow bottles, injection molded products, coating materials for steel pipes and foam-molded materials. As mentioned above, high pressure polyethylenes are excellent in melt rheology characteristics, and therefore, they are excellent in processability. When used for extrusion processing or injection molding, their production efficiency is high, resulting in relatively low electricity consumption. In blown film processing, the above polyethylenes give good bubble stability. In cast film processing and extrusion lamination processing, there is only slight "neck-in". In blow molding, these polyethylenes give good parison stability. However, when they are processed into molded products, their mechanical strengths, such as tensile strength and impact strength, are relatively low and accordingly these products can not be used in thin forms.

High pressure polyethylenes have various other problems. They are used in many fields as films. Films of high pressure polyethylenes are required to have the following properties in recent, highly developed automatic packaging systems.

(1) Good heat-sealing property at low temperatures.

(2) High sealing strength in a condition where heat-sealed portions are not cooled sufficiently therefore not solidified yet (this strength is called "hot tack" strength). Hot tack strength is required because filling of contents and heat sealing are done almost at the same time.

(3) Sealing strength in a state where heat-sealing portions are contaminated with oils and the like, in packaging of oils and the like. (This strength is called heat sealing strength in contaminated condition.) However, high pressure polyethylenes are not satisfactory in hot tack and heat sealing strength in contaminated condition. When these polyethylenes are used in blow bottles, pipes and injection molded products, they are inadequate in environmental stress cracking resistance, therefore, cause occasional troubles and are susceptible to attack by chlorine water. Further, they are not sufficient in creep characteristics, which makes them unusable in pipes of high internal pressure. When high pressure polyethylenes are used as coating materials for steel pipes, their low temperature resistance is not satisfactory, which makes their use in very cold climatic areas improper. In their use as coating materials for electric wires, troubles occur at times due to improper environmental stress cracking resistance and water-tree resistance.

To improve these defects, some attempts have been made. However, the quality is still not at a satisfactory level.

For improvement of these defects, the following polymerization methods have been adopted.

(1) Polymerization of ethylene and other polymerizable monomer such as vinyl acetate.

(2) Method in which ethylene and acrylic acid (or methacrylic acid) are polymerized followed by conversion to a salt with a metal, namely an ionomer.

The former method still has many problems such as (a) reduction of tear strength, rigidity and heat resistance of films, (b) occurrence of corrosion of extruder and smell in processing due to liberation of acetic acid and (c) occurrence of blocking due to sticky film surface and cold flow. The latter method has problems of reduction of thermal stability and weather resistance and of high cost.

Also for improvement of the defects of high pressure polyethylenes, there were made proposals in which a high pressure polyethylene is mixed with another α-olefin polymer such as high density polyethylene, polypropylene, polybutene, or a rubber. However, an improvement in one defect causes another problem and no satisfactory answer has been attained.

As resins which have low densities about equal to those of high pressure polyethylenes, there are known resins which are prepared by co-polymerizing ethylene and an α-olefin under a medium to low pressure using a transition metal catalyst. (Hereinafter, such are abbreviated as "ethylene-α-olefin copolymers".). The copolymers produced with a vanadium catalyst are low in degree of crystallization, and have problems in heat resistance, weather resistance and mechaical strengths. The ethylene-α-olefin copolymers produced under normal polymerization conditions with a titanium catalyst, having generally narrow molecular weight distributions (narrower than those of high pressure polyethylenes), are relatively excellent in mechanical strengths but poor in melt rheology characteristics and have many problems in processing. In blown film processing, a large quantity of electricity is needed, output is reduced or bubble stability is lost. In high speed processing, "shark skin" appears on film surfaces, thereby decreasing product values. Also in blow molding, parison stability is lost, or surfces of molded products turn to "shark skin" and product values are lost. In injection molding, processing temperatures need to be largely raised because of poorer flow property under high pressures as compared with high pressure polyethylenes, which requires more heat energy and moreover causes resin deterioration.

Trials have been made in recent years for solving these problems by improving extruders, screws and dies. These approaches require a large amount of expenditures and moreover techniques have not been fully developed. Further, various other problems such as the following have been encountered:

(1) with respect to mechanical strengths of films produced, balancing of machine direction (MD) and transverse direction (TD) is difficult and the tear strength of MD is poorer than that of high pressure polyethylenes, and (2) film transparency is inferior to that of high pressure polyethylenes, because the ethylene-α-olefin copolymer of narrow molecular weight distribution has a faster crystalization speed than high pressure polyethylenes and causes melt fractures more easily.

Low density ethylene-α-olefin copolymers are difficult to obtain under normal polymerization conditions using a chromium catalyst, because copolymerizability between ethylene and α-olefin is generally lower with chromium catalysts than with titanium catalysts. When a chromium-titanium catalyst is used in order to overcome this problem, ethylene-α-olefin copolymers obtained have wider molecular weight distributions than copolymers produced with a titanium catalyst and have slightly improved processability. However, their mechanical strengths largely worsen and their physical properties are not much different from those of high pressure polyethylenes and these copolymers provide film sheets and bottles inferior in transparency.

For attemping to improve the transparency of these copolymers, when the quantity of an α-olefin is largely increased in polymerization and the density of the copolymer obtained is reduced, only a sticky copolymer having much deteriorated mechanical strengths is produced.

According to the knowledge of the present inventors, ethylene-α-olefin copolymers polymerized under a medium to low pressure using a transition metal catalyst, have non-uniform component distributions. Namely in these copolymers, the number of short chain branching per 1000 carbon atoms (excluding methyl groups at the ends) (hereinafter referred to as "S.C.B." for brevity) varies depending upon molecular weight, and generally lower molecular weight components have larger S.C.B. and higher molecular weight components have smaller S.C.B. This phenomenon is considered to be due to that α-olefins tend to act as a chain transfer agent or act even to active sites of catalyst to which molecular weight regulators such as hydrogen tend to act. (cf. Reference example 1.)

Because of the above phenomenon, ethylene-α-olefin copolymers polymerized with the α-olefin concentration increased with an aim to reduce to a large extent the density of copolymers produced, only give such products as those having increased S.C.B. in their lower molecular weight components, thereby having increased solubility in solvents and poor mechanical strengths and causing surface stickiness. This tendency is particularly remarkable in those ethylene-α-olefin copolymers which are polymerized with a catalyst giving wider molecular weight distributions. One of the reasons for poor mechanical strengths of ethylene-α-olefin copolymers having wide molecular weight distributions will be explained by the above fact.

As described above, ethylene-α-olefin copolymers having densities about equal to those of high pressure polyethylenes and synthesized under a medium to low pressure with a transition metal catalyst, can not satisfy all the requirements of processability, mechanical strengths and transparency. For instance, lowering of molecular weight for improvement of processability results in large reduction in mechanical strengths and disappearance of said copolymer characteristics. Broadening of molecular weight distribution leads to large reduction in mechanical strengths as well (cf. Reference example 2.), and moreover transparency worsens and surfaces of molded products get sticky. Thus, both of processability and physical properties are not met together yet, and any low density ethylene-α-olefin copolymer excellent in processability and mechanical strengths have not yet been provided.

As described above, high pressure polyethylenes are excellent in rheology characteristics and processability but relatively poor in mechanical strengths. On the other hand, ethylene-α-olefin copolymers polymerized under a medium to low pressure with a transition metal catalyst and having densities about equal to those of high pressure polyethylenes, have excellent mechanical strengths due to their narrower molecular weight distributions but are poor in processability. These property differences are considered to originate from molecular structures of polymers.

High pressure polyethylenes are obtained from radical polymerization under a pressure of about 1500 to 4000 kg/cm$^2$ at a temperature of about 150° to 350° C. in an autoclave or a tubular reactor. Their molecular structures are very complicated and, in spite of being homopolymers of ethylene, have short chain branches which are alkyl groups of 1 to 6 carbon atoms. These short chain branches affect crystallinities and therefore densities of polymers. The distribution of short chain branching of high pressure polyethylenes is relatively even, and both lower molecular weight components and higher molecular weight components have almost similar numbers of branches.

Another important feature of high pressure polyethylenes is that the polyethylenes also have long chain branches in complicated structures. Identification of these long chain branches is difficult, but these branches are considered to be alkyl groups of which lengths vary from about lengths of main chains to lengths having carbon atoms of over several thousands. The presence of these long chain branches largely affects melt rheology characteristics of polymers and this is one of the reasons for the excellent processability of high pressure method polyethylenes.

On the other hand, ethylene-α-olefin copolymers synthesized under a medium to low pressure with a transition metal catalyst and having densities about equal to those of high pressure polyethylenes, are obtained by copolymerizing ethylene and an α-olefin under a medium to low pressure of about 5 to 150 kg/cm$^2$ and at 0°-250° C. normally at a relatively low temperature of 30° to 200° C. with a transition metal catalyst in an autoclave or a tubular reactor. Their molecular structures are relatively simple. These ethylene-α-olefin copolymers seldom possess long chain branches and have only short chain branches. These short chain branches are not formed through complicated reaction processes as so in high pressure polyethylenes, but are controlled by the kind of an α-olefin to be used in the copolymerization. As an example, in a copolymerization between ethylene and butene-1, short chain branches formed are normally ethyl branches. These branches could be hexyl branches as a result of dimerization of butene-1. Short chain branches formed control crystallinities and densities of polymers.

Distribution of short chain branches is also affected by the nature of a transition metal catalyst used in the copolymerization, the type of polymerization and the temperature of polymerization. Different from the case of high pressure polyethylenes, the distribution is wide. Namely, as a general trend, lower molecular weight components have larger S.C.B. and higher molecular weight components have smaller S.C.B. (cf. Reference example 1.)

Ethylene-α-olefin copolymers obtained by copolymerizing ethylene and an α-olefin under a medium to low pressure with a transition metal catalyst and having densities about equal to those of high pressure polyethylenes, have come to be practically used. Therefore, the conventional classification that polyethylene resins having densities of 0.910 to 0.935 g/cm³ fall in a category of high pressure polyethylenes, is improper and a new classification should be developed, mainly based on whether or not a polymer or resin has long chain branches. As low density polyethylenes substantially not having long chain branches, there are resins which are obtained by polymerization using a transition metal catalyst under a same high pressure and temperature as employed in the manufacture of high pressure method polyethylenes. These resins are also included in "ethylene-α-olefin copolymers" as defined by the present invention.

Presence or absence of long chain branches is clarified to a considerable extent by a theory of solution. As an example, the presence of long chain branches in an ethylene polymer can be known by using $[\eta]/[\eta]_l$ namely $g_\eta^*$. Herein, $[\eta]$ is the intrinsic viscosity of the ethylene polymer, and $[\eta]_l$ is the intrinsic viscosity of a reference linear polyethylene (high density polyethylene produced from homopolymerization of ethylene under a medium to low pressure with a Ziegler catalyst) having the same weight average molecular weight by the light scattering method. Molecules having more long chain branches have less spread in a solution, and therefore, their $g_\eta^*$ is small. Normally, $g_\eta^*$ of high pressure polyethylenes is 0.6 or less.

This method is useful, but practically presence of long chain branches can be known more easily and clearly by a correlation between melt index and intrinsic viscosity of polymer. This correlation was shown in Reference example 3. In there, the intrinsic viscosity of a high pressure polyethylene is far lower than that of the ethylene-α-olefin copolymer according to medium to low pressure method having the same melt index, because the former polyethylene has long chain branches.

Due to the difference of presence or absence of long chain branches, high pressure polyethylenes and ethylene-α-olefin copolymers give largely different properties in melt rheology characteristics, crystallinity, solid mechanical properties and optical properties.

The present inventors made strenuous efforts with an aim to obtain polyethylenes which will solve the above-mentioned defects of polyethylenes, will have processability equal to or better than that of high pressure polyethylenes, and will be excellent in tear strength, impact strength, environmental stress cracking resistance, low temperature resistance, creep characteristics, chemicals resistance, transparency and heat-sealing characteristics. As a result, the present inventors have found that, by mixing (a) an ethylene-α-olefin copolymer having a relatively higher molecular weight and of which density, intrinsic viscosity, S.C.B., kind of α-olefin and (weight average molecular weight)/(number average molecular weight) are specified and (b) another ethylene-α-olefin copolymer having a relatively lower molecular weight and of which density, intrinsic viscosity, S.C.B., kind of α-olefin and (weight average molecular weight)/(number average molecular weight) are specified, in such a way that the ratio of S.C.B. of the former copolymer over S.C.B. of the latter copolymer is in a specified range, ethylene copolymer compositions can be obtained which have extremely good processability compared with the conventional polyethylenes, as well as very excellent physical and chemical properties such as tear strength, impact strength, environmental stress cracking resistance, low temperature resistance, creep characteristics, chemicals resistance, transparency, and heat-sealing characteristics. The present inventors have also found that ethylene-α-olefin copolymer compositions substantially not having long chain branches and having a specific distribution of S.C.B. provide extremely good properties such as tensile strength, impact strength, environmental stress cracking resistance, low temperature resistance, creep characteristics, chemicals resistance, transparency and heat-sealing characteristics, compared with the conventional polyethylenes, and therefore, with such ethylene-α-olefin copolymer compositions, improvement of processability by broadening of molecular weight distribution can be attained without deterioration of properties described above. Thus, the present invention has been achieved.

According to the present invention, there is provided an ethylene-α-olefin copolymer composition excellent in strength and having a density of 0.910 to 0.940 g/cm³, a melt index of 0.02 to 50 g/10 min. and a melt flow ratio of 35 to 250, which comprises 10 to 70% by weight of an ethylene-α-olefin copolymer A and 90 to 30% by weight of an ethylene-α-olefine copolymer B; said copolymer A being a copolymer of ethylene and an α-olefin of 3 to 18 carbon atoms and having a density of 0.895 to 0.935 g/cm³, an intrinsic viscosity of 1.2 to 6.0 dl/g, and the number of short chain branching per 1000 carbon atoms (S.C.B.) of 7 to 40; said copolymer B being a copolymer of ethylene and an α-olefin of 3 to 18 carbon atoms and having a density of 0.910 to 0.955 g/cm³, an intrinsic viscosity of 0.3 to 1.5 dl/g, and S.C.B. of 5 to 35; said copolymer A and said copolymer B being selected in order to satisfy a condition that (S.C.B. of said copolymer A)/(S.C.B. of said copolymer B) is at least 0.6.

The present invention also provides a composition of copolymers of ethylene and an α-olefin of 3 to 18 carbon atoms, having the following properties:

(1) density of 0.910 to 0.940 g/cm³,
(2) intrinsic viscosity $[\eta]$ of 0.7 to 4.0 dl/g,
(3) melt index of 0.02 to 50 g/10 min,
(4) the number of short chain branching per 1000 carbon atoms (S.C.B.) being 5 to 45,
(5) $[\eta]/[\eta]_l$ namely $g_\eta^*$ being at least 0.8, where $[\eta]_l$ is an intrinsic viscosity of a linear polyethylene having the same weight average molecular weight measured by a light scattering method, and
(6) (S.C.B. of the higher molecular weight components)/(S.C.B. of the lower molecular weight components) being at least 0.6, wherein these two component groups are obtained by a molecular weight fractionation method.

The first feature of this invention is to provide an ethylene copolymer composition of which processability is about equal to or better than that of high pressure polyethylenes and of which physical and chemical properties such as tensile strength, impact strength, environmental stress cracking resistance, creep characteristics, tear strength, transparency, heat-sealing characteristics and chemicals resistance are very excellent.

The second feature of this invention is that, because the product of this invention is excellent in mechanical strengths, has a rigidity higher than those of high pressure polyethylenes and has a transparency about equal to that of high pressure polyethylenes, material saving can be expected with the product of this invention; for instance, when this product is used for films, the same performance can be obtained with the thickness 10 to 20% thinner than that of high pressure polyethylenes.

The third feature of this invention is that, because the product of this invention has extrusion processability superior to that of relatively low density ethylene-α-olefin copolymers by the conventional technique, conventional extruders being used for high pressure polyethylenes can be utilized for the present product without any modification.

The fourth feature of this invention is that, because the present product, even if possessing a melt index lower than that of low density ethylene-α-olefin copolymers by the conventional technique, shows satisfactory flow properties in actual processing, it gives excellent bubble stability and mechanical strengths of machine and transverse directions can be easily balanced, whereby molded products can have a uniform quality.

The fifth feature of this invention is that, because a resin composition less sticky then low density ethylene-α-olefin copolymers by the conventional technique is obtained even when the density of the composition is lowered, the composition can be applied even for the usages where transparency, flexibility and impact characteristics are required.

BRIEF DESCRIPTION OF THE DRAWINGS

In the attached drawings.

Figure 1:
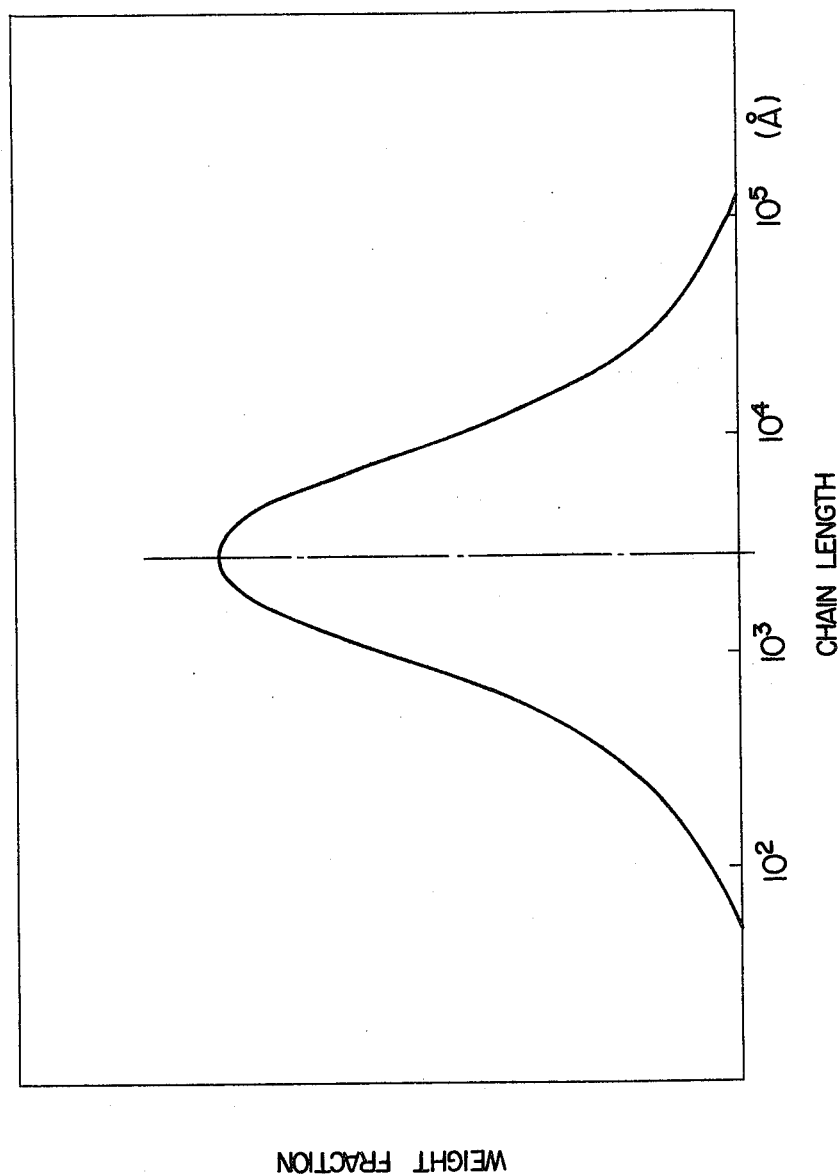
FIGS. 1 to 6 show curves of molecular weight distributions obtained from gel permeation chromatography. Broken lines in these figures are for dividing lower molecular weight components and higher molecular weight components into two respective territories.

The present invention will be explained in more detail below.

An ethylene-α-olefin copolymer of a relatively high molecular weight (hereinafter referred to as "copolymer A") which is used in the present invention as one mixing component, is a copolymer of ethylene and an α-olefin of 3 to 18 carbon atoms. This α-olefin is one represented by the general formula R—CH=CH$_2$ wherein R is an alkyl group of 1 to 16 carbon atoms. Examples of the α-olefin include propylene, butene-1, pentene-1, hexene-1, heptene-1, octene-1, nonene-1, decene-1, 4-methyl-pentene-1, 4-methyl-hexene-1 and 4,4-dimethylpentene-1. Among these olefins, α-olefins of at least 4 carbon atoms are preferred. Particularly, butene-1, pentene-1, hexene-1, octene-1 and 4-methyl-pentene-1 are preferred from the standpoints of monomer availability, copolymerizability and quality of polymer obtained. These α-olefins can be used alone or in combination of two or more. The density of the copolymer A is influenced by the kind of an α-olefin used, the content of the olefin and the intrinsic viscosity of the copolymer. For the object of this invention, the density is required to be 0.895 to 0.935 g/cm$^3$ and more preferably 0.895 to 0.930 g/cm$^3$. At a density smaller than 0.895 g/cm$^3$, copolymers stick to the reactor walls, making polymerization difficult, or, the density of the relatively lower molecular weight copolymer (namely "copolymer B" which is described later and used as another mixing component in the present invention) is required to be raised, resulting in formation of polymer compositions of undesirable qualities such a films of poor transparency. In the density higher than 0.930 g/cm$^3$, the content of the α-olefin in the copolymer A becomes very low, and the copolymer A of such a high density does not give satisfactory mechanical strengths. For instance, in films, balancing of MD and TD strengths becomes difficult and heat-sealing characteristics get worse. S.C.B. in the copolymer A is preferably 7 to 40 and more preferably 10 to 40. (When R in the above α-olefin formula is a linear alkyl group, the number of methyl groups at branch ends per 1000 carbon atoms is S.C.B. When R is an alkyl group with a branch or branches, for instance, the α-olefin is 4-methyl-pentene-1, the branch is isobutyl group and the half number of methyl groups at the branch ends in S.C.B.) Short chain branching in ethylene-α-olefin copolymers occurs due to α-olefins and it hinders crystallization mainly of ethylene sequences and lowers densities. These effects vary depending upon the kind of α-olefin. Short chain branching is considered to also make some contribution to formation of interlamella molecules, and ultimately affects mechanical strengths and thermal properties of copolymers obtained. Therefore, when S.C.B. is below 7, mechanical strengths and heat-sealing properties of the composition become poor. For instance, in films, balancing of MD and TD strengths is difficult. When S.C.B. is over 40, there occur problems in polymerization of the copolymer A. Also the transparency of polymer compositions obtained from the copolymer becomes poor.

The molecular weight of the copolymer A is generally preferred to be 1.2 to 6.0 dl/g as intrinsic viscosity and more preferred to be 1.2 to 4.5 dl/g. When the intrinsic viscosity is below 1.2 dl/g, mechanical strengths of polymer compositions of the present invention are reduced. In over 6.0 dl/g, mixing with the copolymer B becomes difficult, and polymer compositions obtained have fish eyes and further worsened flow properties, as well as reduced transparency. In injection molding, the intrinsic viscosity is preferably 1.2 to 4.0 dl/g and more preferably 1.2 to 3.0 dl/g. If it is less than 1.2 dl/g, mechanical strengths of compositions are lowered. If it is over 4.0 dl/g, mixing with the copolymer B becomes insufficient, and polymer compositions obtained have fish eyes, deteriorated flow properties (tend to cause flow marks) and reduced transparency.

(Weight average molecular weight)/(number average molecular weight) of the copolymer A which is a measure for the molecular weight distribution of the copolymer obtained from gel permeation chromatography (hereinafter abbreviated as "GPC"), is preferably 2 to 10 and more preferably 3 to 8. If it is less than 2, such a copolymer A is difficult to produce. If it is over 10, polymer compositions have lower mechanical strengths and, when processed into films, cause blocking.

An ethylene-α-olefin copolymer of a relatively low molecular weight (hereinafter abbreviated as "copolymer B") which is used in the present invention as another mixing component, is a copolymer of ethylene and an α-olefin of 3 to 18 carbon atoms. As α-olefins, there may be selected the α-olefins used in the copolymer A. The density of the copolymer B is normally preferred to be 0.910 to 0.955 g/cm$^3$. More preferrably, it is 0.915 to 0.953 g/cm$^3$. When the density is below 0.910 the copolymer compositions possess reduced mechanical strengths and cause blocking due to bleeding of lower molecular weight components of low density on film surfaces. When the density is over 0.955 g/cm$^3$, copolymer compositions of this invention possess worsened transparency and too high densities. In the area of injection molding, the density of the copolymer B is preferred to be 0.910 to 0.950 g/cm$^3$ and more preferred to be 0.915 to 0.948 g/cm$^3$. When the density is below 0.910 g/cm$^3$, mechanical strengths of compositions are reduced and surface tackiness occurs. When the density is over 0.950 g/cm$^3$, compositions have too high densities. S.C.B. of the copolymer B is preferred to be 5 to 35 and more preferred to be 7 to 30. When S.C.B. is below 5, the copolymer B has a lower molecular weight as a whole and its crystallization speed is fast, resulting in poor transparency of compositions. In case of over 35, reduction in mechanical strengths as well as blocking in films occurs.

The molecular weight of the copolymer B is 0.3 to 1.5 dl/g preferrably 0.4 to 1.5 dl/g as intrinsic viscosity. When the intrinsic viscosity is less than 0.3 dl/g, mechanical strengths and transparency of compositions are reduced. In case of over 1.5 dl/g, fluidity of compositions is poor. In the area of injection molding, the molecular weight of the copolymer B is preferrably 0.3 to 1.2 dl/g as intrinsic viscosity and more preferrably 0.4 to 1.2 dl/g. When the intrinsic viscosity is below 0.3 dl/g, mechanical strengths and transparency of compositions are reduced. In case of over 1.2 dl/g, fluidity of compositions is poor.

The value of (weight average molecular weight)/(number average molecular weight), namely, Mw/Mn of the copolymer B determined by gel permeation chromatography (GPC) is preferrably 2 to 10 and more preferrably 3 to 8. When Mw/Mn is below 2, the copolymer B is difficult to produce. When over 10, mechanical strengths of the compositions are reduced and surface tackiness of films occurs.

The copolymer A and the copolymer B as mentioned above can be obtained by copolymerizing ethylene and an α-olefin of 4 to 18 carbon atoms under a medium to low pressure using a transition metal catalyst. For instance, catalysts such as Ziegler type catalyst and Phillips type catalyst as well as polymerization methods such as slurry polymerization, gas phase polymerization and solution polymerization are used. As catalysts, a Ziegler type catalyst system using a carrier-supported Ziegler catalyst component is convenient in this invention from its activity and copolymerizability. Specific examples of an effective carrier of this carrier-supported Ziegler catalyst component include oxides, hydroxides, chlorides and carbonates of metals and silicon and their mixtures as well as inorganic complexes. More specifically, they are magnesium oxides, titanium oxides, silica, alumina, magnesium carbonates, divalent metal hydroxychlorides, magnesium hydroxides, magnesium chlorides, magnesium alkoxides, magnesium haloalkoxides, double oxides of magnesium and aluminum and double oxides of magnesium and calcium. Among these compounds, magnesium compounds are particularly preferred. The following magnesium compounds are particularly preferred. The following magnesium compound carrier is most preferred in the production of the low density polyethylene type resin composition of this invention, because it gives a satisfactory slurry with no abnormal tackiness and there occurs no sticking of polymers to the reactor wall. (Reference is made to Japanese Patent Publication No. 23561/1980.) Namely, it is the carrier obtained by (a) reacting in a solvent an aluminum halide represented by the general formula $R_nAlX_{3-n}$ (R is an alkyl, aryl or alkenyl group of 1 to 20 carbon atoms and X is a halogen atom and n is an integer of 0 to 3) and/or a silicon halide represented by the general formula $R_m'SiX_{4-m}$ (R' is an alkyl, aryl or alkenyl group of 1 to 20 carbon atoms and X is a halogen atom and m is an integer of 0 to 4) with an organomagnesium compound represented by the general formulas R"MgX and/or $R_2''$Mg (R" is an alkyl, aryl or alkenyl group of 1 to 20 carbon atoms and X is a halogen atom), and (b) isolating the solid product formed.

As a transition metal catalyst component supported on carriers, there are, for instance, titanium compounds, vanadium compounds and zirconium compounds. Specific examples include titanium tetrachloride, titanium tetrabromide, titanium tetraiodide, titanium trichloride, titanium alkoxy halides or titanium aryloxy halides represented by the general formula $Ti(OR^1)_{4-p}X_p$ (where $R^1$ is a hydrocarbon group, X is a halogen atom and p is an integer of $0<p<4$), vanadium tetrachloride, vanadium oxy trichloride, zirconium tetrachloride and zirconium alkoxy halides or zirconium aryloxy halides represented by the general formula $Zr(OR^2)_{4-q}X_q$ (where $R^2$ is a hydrogen group, X is a halogen atom and q is an integer of $0<q<4$). Among these compounds, titanium compounds and/or vanadium compounds are particularly preferred in the production of the low density polyethylene type resin composition of this invention, because they give satisfactory slurries with no abnormal tackiness and there occurs almost no sticking of polymers to the reactor wall. (Reference is made to Japanese Patent Publication No. 23561/1980.) Titanium compounds are most preferred from the standpoints of weather resistance and heat resistance.

As a component of carrier-supported Ziegler catalysts used in this invention, there are also reaction products between an organomagnesium compound and a transition metal compound. Here, the transition metal compound is represented by the general formula $Ti(OR^3)_{4-r}X_r$ (where $R^3$ is a hydrocarbon group, X is a halogen atom and r is an integer of $0 \leq r \leq 4$, and includes titanium tetrahalides, titanium alkoxides, titanium aryloxides, titanium alkoxy halides and titanium aryloxy halides.

As an organometal compound component which forms the catalyst system of this invention together with the carrier-supported Ziegler catalyst component, there are organoaluminum compounds such as trialkyl aluminums (triethyl aluminum, tri-n-propyl aluminum, tri-i-butyl alminum, tri-n-butyl aluminum, tri-n-hexyl aluminum, etc.), dialkyl aluminum monohalides (diethyl aluminum monochloride, di-n-propyl aluminum monochloride, di-i-butyl aluminum monochloride, di-n-butyl aluminum monochloride, di-n-hexyl aluminum monochloride, etc.), alkyl aluminum dihalides (ethyl aluminum dichloride, n-propyl aluminum dichloride, i-butyl aluminum dichloride, n-butyl aluminum dichloride, n-hexyl aluminum dichloride, etc.), ethyl aluminum sesquichloride, i-propyl aluminum sesquichloride, i-butyl aluminum sesquichloride, n-butyl aluminum sesquichloride and n-hexyl aluminum sesquichloride as well as other organometal compounds such as organozinc compounds. These organometal compounds may be used alone or in combination of two or more.

In compounding the composition of this invention using the ethylene-α-olefin copolymer A of relatively higher molecular weight and the ethylene-α-olefin copolymer B of relatively lower molecular weight both of which are obtained with the above catalyst system under a normal medium to low pressure polymerization method, the following matters must be obeyed.

(1) From the standpoint of mechanical strengths, the copolymers A and B must be selected in order that (S.C.B. of copolymer A)/(S.C.B. of copolymer B) becomes at least 0.6, preferably at least 0.8 and more preferably at least 1.0. Meanwhile, from the standpoint of transparency, it is necessary that (S.C.B. of copolymer A)/(S.C.B. of copolymer B) is 0.6 to 1.7. When this ratio is below 0.6, mechanical strengths of the copolymer composition obtained are reduced. In films, for instance, balancing of MD and TD strengths is difficult, heat-sealing characteristics worsen and tackiness is seen. In case of over 1.7, transparency of the copolymer composition is reduced.

(2) The density of the copolymer composition is normally preferred to be 0.910 to 0.940 g/cm³ and more preferred to be 0.915 to 0.935 g/cm³ and most preferred to be 0.915 to 0.929 g/cm³. When the density is below the above lower limit, mechanical strengths of the composition is reduced and, in case of films, tackiness is seen. When the density is above the upper limit, transparency of the composition worsens.

In the field of extrusion processing, the density of the copolymer composition is preferred to be 0.910 to 0.930 g/cm³ and more preferred to have 0.915 to 0.929 g/cm³. When the density is below the lower limit, mechanical strengths of the composition is reduced and products have tackiness. When the density is above the upper limit, transparency worsens.

In the field of film processing, the density of the copolymer composition is preferred to be 0.910 to 0.940 g/cm³ and more preferred to be 0.915 to 0.935 g/cm³ and most preferred to be 0.915 to 0.929 g/cm³. When the density is below the lower limit, mechanical strengths of the composition are reduced and films possess tackiness. When the density is above the upper limit, transparency worsens.

In the field of injection molding, the density of the copolymer composition is preferred to be 0.910 to 0.935 g/cm³ and more preferred to be 0.915 to 0.929 g/cm³. When the density is below the lower limit, mechanical strengths of the composition is reduced and molded products have tackiness. When the density is above the upper limit, transparency worsens.

(3) The melt index of the copolymer composition is normally preferred to be 0.02 to 50 g/10 min. and more preferred to be 0.05 to 40 g/10 min. and most preferred to be 0.1 to 30 g/10 min. In addition, the melt flow ratio is preferred to be 35 to 250 and more preferred to be 35 to 200 and most preferred to be 35 to 150. Furthermore, the product of the melt index and the melt flow ratio is preferred to be at least 4 and more preferred to be at least 7. When the melt index and the melt flow ratio are below the lower limits, extrusion processability worsens. When they are above the upper limits, bubble stability in blown film processing is lost and mechanical strengths are reduced.

In the field of extrusion processing, the MI of the copolymer composition is preferred to be 0.02 to 2.0 g/10 min. and more preferred to be 0.05 to 2.0 g/10 min. and most preferred to be 0.10 to 2.0 g/10 min. Further, the MFR is preferred to be 35 to 250 and more preferred to be 35 to 200 and most preferred to be 35 to 150. Furthermore, the product of MI and MFR is preferred to be at least 4 and more preferred to be at least 7. When the MI and the MFR are below the lower limits, extrusion processability worsens. When they are above the upper limits, mechanical strengths are reduced.

In the field of film processing, the MI of the composition is preferred to be 0.02 to 5 g/10 min. and more preferred to be 0.05 to 4 g/10 min. and most preferred to be 0.1 to 3 g/10 min. Further, its MFR is preferred to be 35 to 250 and more preferred to be 35 to 200 and most preferred to be 35 to 150. Furthermore, the product of the MI and the MFR is preferred to be at least 4 and more preferred to be at least 7. When the MI and the MFR are below the lower limits, extrusion processability worsens. When they are above the upper limits, bubble stability in blown film processing is insufficient and mechanical strengths are reduced.

In the field of injection molding, the MI of the composition is preferred to be 2.0 to 50 g/10 min. and more preferred to be 2.0 to 30 g/10 min. Further, the MFR is preferred to be 35 to 80 and more preferred to be 35 to 70. When the MI is below the lower limit, moldability worsens and flow marks are produced. When it is above the upper limit, mechanical strengths are reduced.

In order to provide the composition of this invention excellent in processability and mechanical strengths, it is also important to adequately balance its MI and MFR. A lower MI requires a higher MFR. This requirement is expressed by the product of MI and MFR. For instance, a composition having a MI of about 1 g/10 min, even if its MFR is as low as 50 to 60, has processability about equal to that of a high pressure polyethylene having the same MI. On the other hand, a composition having a MI of about 0.05 g/10 min. and a MFR of 50 possesses extremely poor processability and, in order to have satisfactory processability, a MFR of at least 80 is required. The product of MI and MFR of a composition is designed appropriately to meet the requirement of its final application. The designed value of the product of MI and MFR can be achieved in the composition by using (a) intrinsic viscosities of the copolymer A of relatively higher molecular weight and the copolymer B of relatively lower molecular weight, (b) values of (weight average molecular weight)/(number average molecular weight) of these copolymers and (c) their mixing ratio. If intrinsic viscosities of the copolymer A and the copolymer B are put as $[\eta]_A$ (dl/g) and $[\eta]_B$ (dl/g), respectively, and their ratios by weight basis are put as $W_A$ and $W_B$ ($W_A + W_B = 1$), respectively the intrinsic viscosity of the composition obtained by mixing the two copolymers namely $[\eta]_T$ (dl/g) is approximately given by the following formula.

$$[\eta]_T \approx [\eta]_A W_A + [\eta]_B W_B$$

MI is governed by $[\eta]_T$ unequivocally. Meanwhile, MFR is generally larger when $[\eta]_A/[\eta]_B$ is larger, and depends upon $W_A$ and $W_B$. Therefore, it is difficult to express MFR unequivocally and, based on preliminary tests, $[\eta]_A$, $[\eta]_B$, $W_A$ and $W_B$ are determined to give an intended MFR.

(4) In order to obtain a composition which satisfies the above (1) to (3) conditions, the copolymer A and the copolymer B are preferred to be mixed at a ratio of 10 to 70% by weight (copolymer A) to 90 to 30% by weight (copolymer B). The ratio of 20 to 65% by weight to 80 to 35% by weight is more preferred and the ratio of 30 to 60% by weight to 70 to 40% by weight is most preferred. The mixing ratio of the two copolymers must be adequately selected by considering S.C.B., densities, intrinsic viscosities and molecular weight distributions of the copolymers A and B as well as the density, MI and MFR of an intended composition. When the ratio of the copolymer A is below its lower limit and the ratio of the copolymer B is above its upper limit, the ESCR, impact strength, tear strength and low temperature resistance of the composition obtained are poor, and the high strength of the composition of this invention which is obtained when the value of (S.C.B. of copolymer A)/(S.C.B. of copolymer B) is selected to be at least 0.6 as well as the good transparency of the composition of this invention which is obtained when the value of (S.C.B. of copolymer A)/(S.C.B. of copolymer B) is selected to be 0.6 to 1.7, are not achieved. When the ratio of the copolymer A is above its upper limit and the ratio of the copolymer B is below its lower limit, the processability of the composition obtained worsens.

As long as the scope of this invention is obeyed, mixing of the ethylene-α-olefin copolymer A of relatively higher molecular weight and the ethylene-α-olefin copolymer B of relatively lower molecular weight is not necessarily limited to mixing one of each kind. The mixing may be also done by using two or more kinds of each of the copolymer A and the copolymer B.

There is no particular limitation to mixing methods of the copolymers A and B, and known methods can be used in mixing of these two polymers. Commonly used are a batch type melt kneading method which employs a twin roll or a Banbury mixer after separate production of the copolymers A and B, a continuous melt kneading method employing a twin rotor mixer such as CIM (manufactured by the Japan Steel Works) or FCM (manufactured by Kobe Steel) or a single screw extruder and a solution mixing method in which a mixture is obtained by dissolving the copolymers A and B in a solvent separately or together, blending and finally removing the solvent. When the copolymers A and B are produced by a high temperature solution polymerization method, it is advantageous from the process standpoint that their composition is obtained by mixing A and B in a solution state at high temperatures and removing the solvent.

Mixing by a two- or multi-stage polymerization method is also possible. In this method, in the first stage, the copolymer A is polymerized for a certain length of time and, successively in the second stage, the copolymer B is polymerized using the same catalyst but changing other polymerization conditions until the composition containing the copolymers A and B at an intended ratio is obtained. In this case, the order of polymerization of A and B is not restricted.

The above two- or multi-stage polymerization method is an ideal mixing method, because the copolymers A and B undergo molecular dispersion.

The most effective mixing method can be selected from above various mixing methods, in order to obtain a uniform composition, which meets intended requirements.

The intrinsic viscosity $[\eta]$ of the ethylene-α-olefin copolymer composition of this invention is preferred to be 0.7 to 4 dl/g and more preferred to be 0.8 to 3.5 dl/g and most preferred to be 0.9 to 3 dl/g. When the intrinsic viscosity is below the lower limit, mechanical strengths are reduced and, in blown film processing, bubble stability is insufficient. In case of above the upper limit, extrusion processability worsens.

S.C.B. of the composition is preferred to be 5 to 45 and more preferred to be 7 to 40 and most preferred to be 10 to 40. When S.C.B. is below its lower limit, transparency worsens. When S.C.B. is above its upper limit, mechanical strengths are reduced and molded products have tackiness.

Next, the "index of long chain branching" of the copolymer composition of this invention is described. When the intrinsic viscosity of a copolymer composition of this invention is put as $[\eta]$ and the intrinsic viscosity of a linear polyethylene having the same Mw measured by light scattering method (a high density polyethylene obtained by homopolymerization of ethylene under a medium to low pressure using a Ziegler catalyst) is put as $[\eta]_l$, $[\eta]/[\eta]_l$ namely $g_\eta^*$ is called the "index of long chain branching" of the composition and indicates the extent of presence of long chain branching in the composition. Now, intrinsic viscosities of two polymers are compared. One polymer X is a polyethylene having long chain branches of which index of branching is unknown (for instance, a high pressure polyethylene) and the other polymer is a linear polyethylene containing no long chain branches but having the same Mw measured by light scattering method. When these two polymers are made into respective very dilute solutions with one same solvent, the polymer X gives a less-viscous solution because the spread of its molecular chain is smaller than that of the linear polyethylene. Accordingly, by measuring the intrinsic viscosities of the two polymers and calculating their ratio namely $g_\eta^*$, the index of long chain branching can be known. When a polymer has no long chain branches, its $g_\eta^*$ is almost 1 within the range of experimental errors. When the polymer has long chain branches, $g_\eta^*$ is smaller than 1. In most cases, high pressure polyethylenes show $g_\eta^*$ of below 0.6 and have considerable quantities of long chain branches.

The ethylene-α-olefin copolymer composition of this invention is preferred to have $g_\eta^*$ of at least 0.8 and more preferably at least 0.9 and practically has no long chain branches. When $g_\eta^*$ is below 0.8 and contain a large quantity of long chain branches, the copolymer is poor in tensile strength, impact strength, environmental stress cracking resistance, low temperature resistance and chemicals resistance.

(S.C.B. of higher molecular weight components)/(S.C.B. of lower molecular weight components) of the copolymer composition of this invention is preferred to be at least 0.6 and more preferred to be at least 0.8 and most preferred to be at least 1.0. In applications where transparency is required, 0.6 to 0.8 is preferred. Here, these S.C.B. are obtained by dividing the composition of this invention into two groups of lower molecular weight components and higher molecular weight components using molecular weight fractionation and then measuring S.C.B. of each group. When the ratio is below 0.6, mechanical strengths of the composition are poor, and when the composition is subjected to extrusion processing and injection molding, balancing of MD and TD strengths is difficult and molded products have sticky surfaces, and in films, heat-sealing characteristics worsen. When the ratio is over 0.8, transparency worsens and therefore such a polymer is not suitable for applications where transparency is required. The above molecular weight fractionation of the ethylene-α-olefin copolymer into two groups of lower and higher molecular weight components refers to the following method.

(1) A curve of molecular weight distribution is obtained by gel permeation chromatography.

In this case, the abscissa is the logarithm of chain length (unit Å) calibrated with a standard polystyrene sample, and the ordinate is relative weight fraction. The standard measurement method is described later.

(2) An example of cases where curves of molecular weight distributions have one peak was shown in FIG. 1. This pattern is seen most typically in ethylene-α-olefin copolymers. In this case, a lower molecular weight components side and a higher molecular weight components side are divided by a line drawn between the peak of the curve and the midpoint of a line drawn between the end of lower molecular weight components in the curve and the end of higher molecular weight components; and the ratio of areas of these two sides is the weight ratio of lower and higher molecular weight components. Separately, fractions of the same sample are prepared by column fractionation. These fractions are consolidated into two portions of lower and higher molecular weight components, in order that the weight ratio of these two portions become closest to the weight ratio obtained above.

Figure 2:
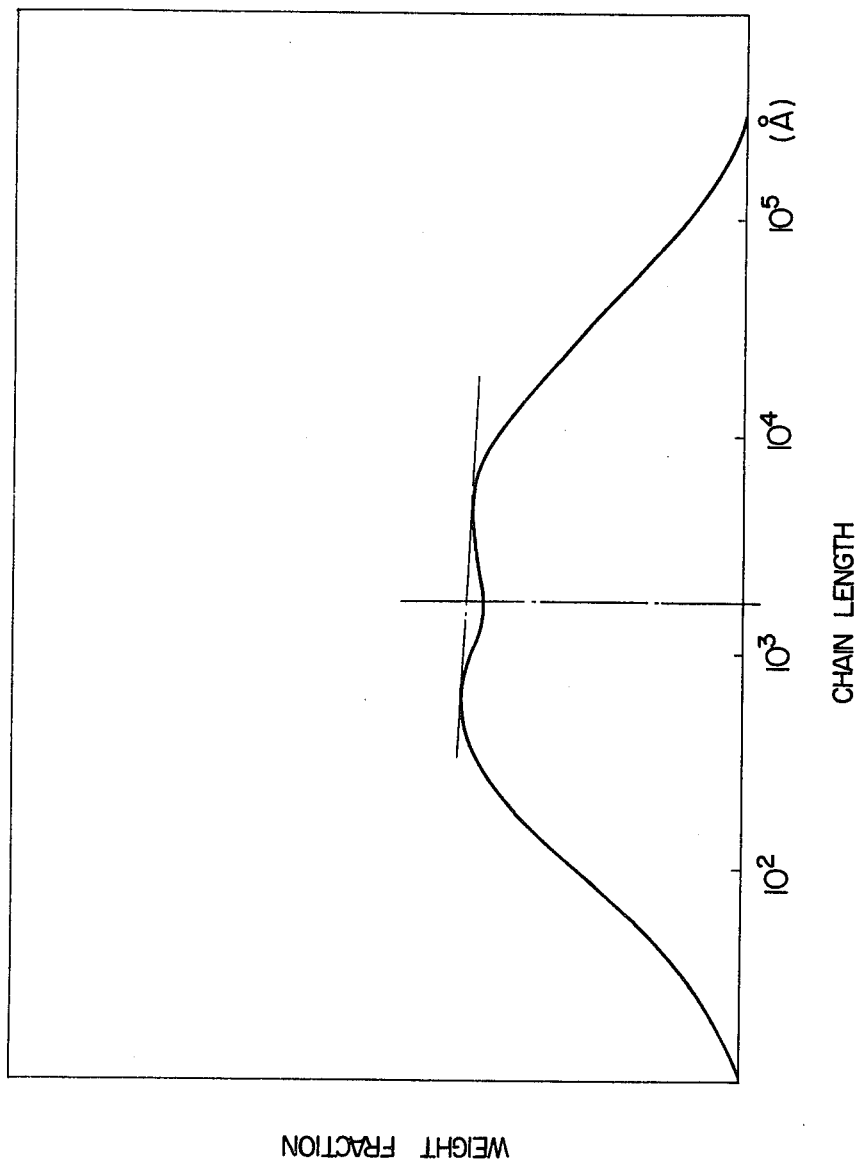
Figure 3:
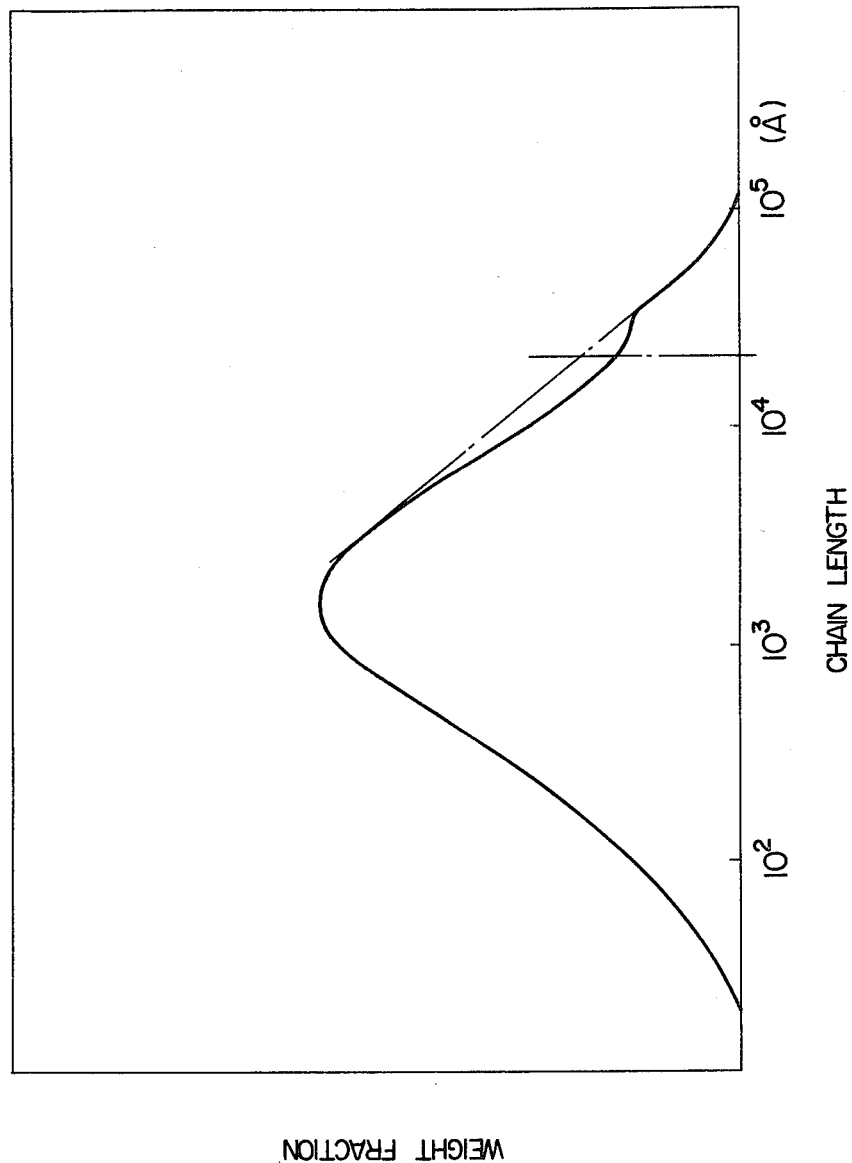

(3) An example of cases where curves of molecular weight distributions have two peaks was shown in FIG. 2. Also, an example having one peak but showing a shoulder at higher molecular weight components side was shown in FIG. 3. Examples having three or more peaks are handled as modifications of two peaks and are treated similarly to two peaks. In the case of two or more peaks including shoulders, a tangent line is drawn between main two peaks of the higher molecular weight components side or between one peak and a shoulder of the same side, and then a perpendicular is drawn from a point where the distance between the GPC curve and the tangent line becomes largest. This perpendicular splits the lower molecular weight components side and the higher molecular weight components side, and the ratio of areas of these two sides becomes the weight ratio of these two components portions. When peaks are continuous and can not be detected (case of somewhat square curve), the technique of one peak distribution is applied. Separately, fraction of the same sample are prepared by column fractionation. These fractions are consolidated into two portions of lower and higher molecular weight components, in order that the weight ratio of these two portions becomes closest to the weight ratio thus obtained.

Molecular weight fractionation is conducted by the known column fractionation method. Its detailed explanation is made in "Polymer Fractionation" (compiled by M. J. R. Cantow, Academic Press, published in 1967), and therefore, only the outline of the method is described below.

About 5 g of a sample is adsorbed on a carrier, Celite 745, in xylene and the carrier is charged into a column. The column is heated to 130° C. and a mixed solvent of butyl cellosolve and xylene is passed through the column with their mixing ratio being gradually changed (namely with the solvency of the mixed solvent being gradually changed). The lower molecular weight fractions to higher molecular weight fractions are successively fractionated. To each eluate is added methanol to cause precipitation. After recovery of each polymer, they are dried under reduced pressure to be used as each fraction. To prevent the decomposition of polymers during fractionation, 100 ppm of Irganox®1076 is added to the original sample as a stabilizer, and also nitrogen is passed through the column to shut off oxygen. The polymer fractions obtained are divided into two groups of lower and higher molecular weight components so that the weight ratio of these two groups become the abovementioned weight ratio. Each group is made into a press sheet of about 100 to 300μ thickness and these sheets are subjected to Fourier-transform infra-red absorption spectroscopy.

Further, it is preferable that the characteristic values of the sample obtained by dividing the ethylene-α-olefin copolymer of this invention into two fractions such as a higher molecular weight component and a lower molecular weight component are same to the characteristic values of copolymer A and copolymer B, respectively, as previously defined.

When compared with low density ethylene-α-olefin copolymers obtained from the conventional medium to low pressure method (normally called "linear low density polyethylene or LLDPE"), the polyethylene type resin composition of this invention has the following advantages.

In the field of extrusion processing, the composition of this invention is largely excellent in processability (about equal even to high pressure polyethylenes) and moreover has excellent mechanical strengths (ESCR, tensile strength, impact strength and tear strength) as well as excellent low temperature resistance. Therefore, reduction in thicknesses of molded products becomes possible. The composition of this invention has wide applications and can be used even in the application where transparency is required.

In case of films, the present composition is far superior in processability (about equal even to high pressure polyethylenes). Further, the composition has excellent mechanical strengths such as tensile strength, impact strength and tear strength, by which reduction in thicknesses of films becomes possible. Moreover, the present composition has excellent transparency and heat-sealing characteristics, by which it is used as a high quality film in wide applications including high speed bag manufacturing.

In the field of injection molding, the present composition is largely excellent in processability (about equal even to high pressure polyethylenes). Moreover, there occurs no flow marks, there is no warpage with molded products, and transparency, low temperature resistance and mechanical strengths such as environmental stress cracking resistance, tensile strength and impact strength are excellent. Thereby, reduction in thicknesses of molded products is possible and the present composition has wide applications including the case where transparency is required.

To the composition of this invention, can be added if necessary various additives being commonly used in the industries such as oxidation inhibitors, lubricants, anti-blocking agents, anti-static agents, photostabilizers, and coloring pigments. Also, other polymers can be added in small quantities as long as the scope of this invention is kept.

Next, the definitions of physical and chemical properties used in this invention are explained below.

(1) Intrinsic viscosity

This implies $[\eta]$ in tetralin of 135° C.

$$[\eta] = 11.65 \times \log R$$

$$R = t/t_o$$

t: Seconds of dropping in a concentration of 0.2 dl/g
$t_o$: Seconds of dropping of tetralin itself (2) Density According to the specification in JIS-K-6760.

With respect to the copolymer B of lower molecular weight, when it has a large S.C.B., it is regarded as a low density product, and according to the specification, it must be subjected to annealing of 100° C. and 1 hour. However, the copolymer B was conformed in all cases to the specification for high density products and was not subjected to the above annealing.

(3) S.C.B.

Using the $C_{14}$ labelled product described in the following literature, the subject property was calculated by employing the FT-IR spectrum substraction method.

"Characterization and Properties of Polymers"
Published by KAGAKU DOJIN
Compiled by Mitsuru Nagasawa et al.
Issued on July 10, 1970
Pages 131 to 146

Determination formulas for various branches are given below.

| Branch | Determination formula |
|---|---|
| Methyl | Branches/1000 C = 0.49 · K 7.25μ |
| Ethyl | Branches/1000 C = 0.70 · K 7.25μ |
| n-Butyl | Branches/1000 C = 0.80 · K 7.25μ |
| n-Decyl | Branches/1000 C = 0.78 · K 7.25μ |
| Other linear chains | Branches/1000 C = 0.80 · K 7.25μ |
| i-Butyl | Branches/1000 C = 0.45 · K 7.23μ |

$K_{7.25\mu}$ (absorptivity) was obtained by using as a reference a linear ethylene homopolymer having the almost same molecular weight and molecular weight distribution and the same $[\eta]$ as those of a given sample and employing the spectrum substraction method. Therefore, effects of methyl groups at the ends were cleared.

When R of an α-olefin R—CH=CH$_2$ is a linear alkyl, (the number of methyl groups at the branch ends)/1000C is S.C.B. When R is a branched alkyl group, for instance, an α-olefin is 4-methyl-pentene-1, the branch is the i-butyl group and half number of methyl groups at the branch ends per 1000 carbon atoms is S.C.B.

(4) Weight average molecular weight by light scattering method

This item was measured at 125° C. by the normal method, with α-chloronaphthalin used as a solvent and employing a photoelectric type light scattering photometer (manufactured by SHIMAZU SEISAKUSHO).

(5) Melt index (MI)

According to the condition E of ASTM D 1238.

(6) Melt flow ratio (MFR)

Firstly, $MI_{21.6}$ (grams per 10 min. under a load of 21.6 kg at 190° C.) is measured according to ASTM D 1238 condition F. Then, MFR is calculated using the following formula.

$$MFR = MI_{21.6}/MI$$

(7) Rigidity (expressed by Olsen's flexural modulus)

According to ASTM D 747.
Press condition: ASTM D 1898 method C
Test piece: 25×70×1 mm thickness
Span: 25 mm
Measurement temperature: 20° C.

(8) Tensile impact strength: According to ASTM D 1822

Press condition: ASTM D 1898 method C
Test piece: S type dumbbell, 1 mm thickness
Annealing: 1 hour in boiling water
Measurement temperature: 20° C.

(9) Molecular weight distribution (Mw/Mn)

GPC method (gel permeation chromatography method)
HLC-811 (manufactured by TOYO SODA)
Column: TSK-GEL (GMSP+G$_{7000}$H$_4$+GMHx2)
Solvent: 1,2,4-trichlorobenzene (TCB)
Temperature: 145° C.
Detector: Differential refractometer
Flow quantity: 1 ml/min.
Concentration: 15 mg/10 ml TCB
Measurement data on standard polystyrenes are shown below.

| Polystyrene | Nominal value | | | Measured value | | |
|---|---|---|---|---|---|---|
| | $\overline{Mw}$ | $\overline{Mn}$ | $\overline{Mw}/\overline{Mn}$ | $\overline{Aw}$ | $\overline{An}$ | $\overline{Aw}/\overline{An}$ |
| #41955 (Waters') | 9.82 × 10$^4$ | 9.62 × 10$^4$ | 1.02 | 2083 | 1744 | 1.19 |
| A 5000 (TOYO SODA's) | 6.2 × 10$^3$ | 5.96 × 10$^3$ | 1.04 | 140 | 112 | 1.25 |

(10) Environmental stress cracking resistance (ESCR)

According to ASTM D 1693.
Expressed in $F_{50}$ (hr).
The following exceptions were adopted.
Concentration of Antarox-CO630: 10% by weight
Sample: 3 mm thickness, 0.5 mm notch

(11) Tensile strength

According to ASTM D 638.

(12) Resistance to chlorine water

Test solution: 0.2% chlorine water
Solution quantity: A quantity which gives 1.2 ml/cm$^2$ against a pressed sample. The solution is replaced daily.
Temperature: 40° C.
Evaluation: 10 stage evaluation on a sample after 72 hours.
  1: Excellent,
  10: Overall surface like "foam"

(13) Transparency (haze value)

Press condition: 180° C.×10 min, rapid cooling in ice water
Sample: 100μ thickness Haze measurement: Internal haza
(14) Brabender torque
Brabender plastograph ® was used.
Jacket: W 50 model, 45 g filled
Temperature: 190° C.
Rotor revolution: 60 rpm
A torque after 30 min. is expressed in kg-m.
(15) Spiral flow length
Injection molding machine: 5 ounce injection molding machine manufactured by the Japan Steel Works, Ltd.
Mold: Spiral mold (7.5 mm$\phi$ semicircle, 2000 mm length)
Molding condition:
Resin temperature 250° C.
Mold temperature 40° C.
Injection pressure 840 kg/cm$^2$
Injection molding is carried out with this molding condition and spiral flow length is measured.

The present invention is explained below in more detail by the following examples, but it is not restricted by these examples.

EXAMPLE 1

(1) Synthesis of Organomagnesium Compound

In a 500 ml four-necked flask equipped with a stirrer, a reflux condenser, and a dropping funnel was placed 16.0 g of flake-shaped magnesium to be used for the production of Grignard reagents. The air and moisture inside the flask were completely replaced by nitrogen. Into the dropping funnel were charged 68 ml (0.65 mol) of n-butyl chloride and 30 ml of n-butyl ether. About 30 ml of this solution was dropped into the flask to initiate a reaction, and thereafter the rest of the solution was dropped in 4 hours at 50° C. After the completion of dropping, the reaction was continued for further 1.5 hours at 60° C. Then, the reaction system was cooled to room temperature and the unreacted magnesium was filtered off by the use of a glass filter.

n-Butyl magnesium chloride in the n-butyl ether was measured for its concentration by hydrolyzing with 1 N sulfuric acid and back-titrating with 1 N sodium hydroxide using phenolphthalein as an indicator. The concentration was 1.96 mol/l.

(2) Synthesis of Solid Catalyst Component

The air and moisture inside a 500 ml four-necked flask equipped with a stirrer, a dropping funnel and a thermometer was completely replaced by nitrogen. In the flask was placed 130 ml of the n-butyl ether solution containing 0.26 mol of n-butyl magnesium chloride synthesized in the above step (1). From the dropping funnel was dropped 30 ml (0.26 mol) of silicon tetrachloride over 2 hours at 50° C. The reaction was continued further for 1 hour at 60° C. The formed white solid was separated, washed with n-heptane and dried under reduced pressure to obtain 31.5 g of a white solid. Ten grams of this white solid was placed in a 100 ml four-necked flask and 50 ml of titanium tetrachloride was added. They were allowed to react with stirring for 1 hour at 100° C. After the completion of the reaction, n-heptane washing was applied until the washings became free from titanium tetrachloride. After drying under reduced pressure, 7.9 g of a solid catalyst component was obtained. Each 1 g of this solid catalyst component supported 14 mg of titanium.

EXAMPLE 2

Ethylene-α-olefin copolymers A were polymerized, using the catalyst produced in Example 1 and organoaluminum compounds (co-catalyst) and employing various α-olefins and other polymerization conditions as shown in Table 1. Densities, intrinsic viscosities, S.C.B. and (weight average molecular weight/number average molecular weight) of these polymers obtained were also shown in Table 1.

These copolymers are used in the following examples as mixing components.

EXAMPLE 3

Ethylene-α-olefin copolymers B were polymerized, using the catalyst produced in Example 1 and organo-aluminum compounds (co-catalyst) and employing various α-olefins and other polymerization conditions as shown in Table 2. Densities, intrinsic viscosities, S.C.B. and (weight average molecular weight/number average molecular weight) of these ethylene-α-olefin copolymers were also shown in Table 2.

These copolymers are used in following examples as mixing components.

TABLE 1

| No. | Polymerization method | Polymerization vessel capacity (l) | Catalyst quantity (mg) | Co-catalyst (mmol) | Solvent (kg) | α-olefin (kg) | $H_2$ partial pressure (kg/cm$^2$) | $C'_2$- partial pressure (kg/cm$^2$) | Polymerization temperature (°C.) | Density (g/cm$^3$) | [η] (dl/g) | S.C.B. | $\overline{M_w}/\overline{M_n}$ |
|---|---|---|---|---|---|---|---|---|---|---|---|---|---|
| A1-1 | Slurry | 65 | 134 | TEA 100 | $C_4$ 6.0 | $C'_4$ 6.14 | 0.84 | 5.6 | 50 | 0.900 | 2.2 | 38 | 5.9 |
| A1-2 | Solution | 1 | 25.3 | DEAC 2.5 | $C_7$ 0.25 | 4-MP-1 0.110 | 0.1 | 20 | 140 | 0.904 | 2.5 | 23 | 3.6 |
| A1-3 | Slurry | 65 | 130 | TEA 50 | $C_4$ 6.0 | $C'_4$ 6.14 | 0.25 | 6.0 | 50 | 0.905 | 3.2 | 30 | 5.8 |
| A1-4 | Slurry | 65 | 310 | TEA 100 | $C_4$ 6.0 | $C'_4$ 6.14 | 0.86 | 9.5 | 50 | 0.915 | 2.5 | 19 | 5.5 |
| A1-5 | Slurry | 65 | 102 | TEA 50 | $C_4$ 6.0 | $C'_4$ 6.14 | 0.059 | 4.5 | 50 | 0.908 | 4.4 | 25 | 6.0 |
| A1-6 | Solution | 1 | 26.0 | DEAC 2.5 | $C_7$ 0.30 | $C'_6$ 0.060 | 0.1 | 20 | 140 | 0.903 | 2.5 | 25 | 3.7 |
| A1-7 | Solution | 1 | 327 | TEA 100 | $C_7$ 0.30 | $C'_6$ 0.060 | 8 1.8 | 12.0 | 140 | 0.922 | 2.2 | 13 | 5.3 |
| A1-8 | Solution | 1 | 24.5 | DEAC 2.5 | $C_7$ 0.30 | 4-MP-1 0.050 | 0.15 | 20 | 140 | 0.920 | 2.5 | 10 | 3.7 |
| A1-9 | Slurry | 65 | 330 | TEA 100 | $C_4$ 6.0 | $C'_4$ 6.14 | 1.1 | 12.0 | 50 | 0.921 | 2.5 | 13 | 5.5 |
| A1-10 | Slurry | 65 | 309 | TEA 100 | $C_4$ 6.0 | $C'_4$ 6.14 | 1.2 | 8.0 | 50 | 0.911 | 2.2 | 25 | 5.7 |
| A1-11 | Slurry | 65 | 121 | TEA 50 | $C_4$ 6.0 | $C'_4$ 6.14 | 0.98 | 6.5 | 50 | 0.907 | 2.2 | 30 | 5.7 |
| A1-12 | Slurry | 65 | 320 | TEA 100 | $C_4$ 6.0 | $C'_4$ 6.14 | 3.0 | 20 | 50 | 0.928 | 2.2 | 8 | 5.3 |
| A1-13 | Solution | 1 | 25.0 | DEAC 2.5 | $C_7$ 0.25 | $C'_8$ | 0.1 | 20 | 140 | 0.903 | 2.5 | 24 | 3.9 |

TABLE 1-continued

| No. | Polymerization method | Polymerization vessel capacity (l) | Catalyst quantity (mg) | Co-catalyst (mmol) | Solvent (kg) | α-olefin (kg) | $H_2$ partial pressure ($kg/cm^2$) | $C'_2$ partial pressure ($kg/cm^2$) | Polymerization temperature (°C.) | Density ($g/cm^3$) | $[\eta]$ (dl/g) | S.C.B. | $\overline{Mw}/\overline{Mn}$ |
|---|---|---|---|---|---|---|---|---|---|---|---|---|---|
| | | | | | | 0.140 | | | | | | | |

Note
TEA = Triethyl aluminum
DEAC = Diethyl aluminum chloride
4-MP-1: 4-Methylpentene-1
$C'_2$ = Ethylene
$C_4$ = n-Butane
$C'_4$ = Butene-1
$C'_6$ = Hexene-1
$C'_9$ = Octene-1
$C_7$ = n-Heptane

TABLE 2

| No. | Polymerization method | Polymerization vessel capacity (l) | Catalyst quantity (mg) | Co-catalyst (mmol) | Solvent (kg) | α-olefin (kg) | $H_2$ partial pressure ($kg/cm^2$) | $C'_2$ partial pressure ($kg/cm^2$) | Polymerization temperature (°C.) | Density ($g/cm^3$) | $[\eta]$ (dl/g) | S.C.B. | $\overline{Mw}/\overline{Mn}$ |
|---|---|---|---|---|---|---|---|---|---|---|---|---|---|
| B1-1 | Slurry | 65 | 345 | TEA 100 | $C_4$ 15.2 | $C'_4$ 1.2 | 11.5 | 5.0 | 70 | 0.943 | 0.63 | 15 | 5.5 |
| B1-2 | Solution | 1 | 25.5 | DEAC 2.5 | $C_7$ 0.28 | 4-MP-1 0.030 | 3.0 | 10 | 140 | 0.938 | 0.50 | 13 | 3.5 |
| B1-3 | Slurry | 65 | 415 | TEA 50 | $C_4$ 15.2 | $C'_4$ 1.6 | 11.0 | 5.0 | 70 | 0.936 | 0.62 | 20 | 5.6 |
| B1-4 | Slurry | 65 | 425 | TEA 50 | $C_4$ 15.2 | $C'_4$ 2.0 | 10.5 | 5.0 | 70 | 0.929 | 0.65 | 25 | 5.7 |
| B1-5 | Slurry | 65 | 286 | TEA 50 | $C_4$ 6.0 | $C'_4$ 6.14 | 9.4 | 8.5 | 50 | 0.927 | 1.1 | 25 | 5.8 |
| B1-6 | Slurry | 65 | 410 | TEA 100 | $C_4$ 12.0 | $C'_4$ 3.0 | 11.0 | 3.0 | 50 | 0.910 | 0.60 | 35 | 5.9 |
| B1-7 | Solution | 1 | 25.7 | DEAC 2.5 | $C_7$ 0.25 | 4-MP-1 0.050 | 2.5 | 10 | 140 | 0.912 | 0.52 | 22 | 3.6 |
| B1-8 | Slurry | 65 | 250 | TEA 100 | $C_4$ 15.2 | $C'_4$ 0.4 | 13.5 | 1.5 | 50 | 0.930 | 0.28 | 25 | 5.7 |
| B1-9 | Slurry | 65 | 407 | TEA 100 | $C_4$ 15.2 | $C'_4$ 0.5 | 13.0 | 5.0 | 70 | 0.954 | 0.62 | 8 | 5.2 |
| B1-10 | Slurry | 65 | 422 | TEA 50 | $C_4$ 15.2 | $C'_4$ 1.8 | 11.0 | 5.0 | 70 | 0.934 | 0.61 | 22 | 5.6 |
| B1-11 | Slurry | 65 | 405 | TEA 50 | $C_4$ 15.2 | $C'_4$ 1.4 | 11.0 | 5.0 | 70 | 0.939 | 0.62 | 18 | 5.5 |
| B1-12 | Solution | 1 | 26 | DEAC 2.5 | $C_7$ 0.25 | $C'_8$ 0.040 | 3.0 | 10 | 140 | 0.937 | 0.49 | 14 | 3.6 |

Note
TEA = Triethyl aluminum
DEAC = Diethyl aluminum chloride
4-MP-1 = 4-Methylpentene-1
$C'_2$ = Ethylene
$C_4$ = n-Butane
$C'_4$ = Butene-1
$C'_6$ = Hexane-1
$C'_8$ = Octene-1
$C_7$ = n-Heptane

EXAMPLE 4

Ethylene-α-olefin copolymers A were polymerized, using the catalyst produced in Example 1 and organoaluminum compounds (co-catalyst) and employing various α-olefins and other polymerization conditions shown in Table 3. Densities, intrinsic viscosities, S.C.B. and (weight average molecular weight/number average molecular weight) of these ethylene/α-olefin copolymers were also shown in Table 3.

These copolymers are used in the following examples as mixing components.

EXAMPLE 5

Ethylene-α-olefin copolymers B were polymerized, using the catalyst produced in Example 1 and organoaluminum compounds (co-catalyst) and employing various α-olefins and other polymerization conditions as shown in Table 4. Densities, intrinsic viscosities, S.C.B. and (weight average molecular weight/number average molecular weight) of these ethylene/α-olefin copolymers were also shown in Table 4.

These copolymers are used in the following examples as mixing components.

TABLE 3

| No. | Polymerization method | Polymerization vessel capacity (l) | Catalyst quantity (mg) | Co-catalyst (mmol) | Solvent (kg) | α-olefin (kg) | $H_2$ partial pressure ($kg/cm^2$) | $C'_2$ partial pressure ($kg/cm^2$) | Polymerization temperature (°C.) | Density ($g/cm^3$) | $[\eta]$ (dl/g) | S.C.B. | $\overline{Mw}/\overline{Mn}$ |
|---|---|---|---|---|---|---|---|---|---|---|---|---|---|
| A2-1 | Slurry | 65 | 145 | TEA 100 | $C_4$ 6.0 | $C'_4$ 6.14 | 1.38 | 6.0 | 50 | 0.902 | 1.8 | 38 | 5.9 |
| A2-2 | Solution | 1 | 25.5 | DEAC 2.5 | $C_7$ 0.25 | 4-MP-1 0.11 | 0.5 | 20 | 140 | 0.908 | 1.8 | 23 | 3.8 |

TABLE 3-continued

| No. | Polymerization method | Polymerization vessel capacity (l) | Catalyst quantity (mg) | Co-catalyst (mmol) | Solvent (kg) | α-olefin (kg) | $H_2$ partial pressure (kg/cm²) | $C'_2$ partial pressure (kg/cm²) | Polymerization temperature (°C.) | Density (g/cm³) | [η] (dl/g) | S.C.B. | $\overline{Mw}/\overline{Mn}$ |
|---|---|---|---|---|---|---|---|---|---|---|---|---|---|
| A2-3 | Slurry | 65 | 141 | TEA 50 | $C_4$ 6.0 | $C'_4$ 6.14 | 0.59 | 6.5 | 50 | 0.907 | 2.5 | 30 | 5.8 |
| A2-4 | Slurry | 65 | 307 | TEA 100 | $C_4$ 6.0 | $C'_4$ 6.14 | 2.3 | 11 | 50 | 0.918 | 1.8 | 17 | 5.4 |
| A2-5 | Slurry | 65 | 311 | TEA 100 | $C_4$ 6.0 | $C'_4$ 6.14 | 1.84 | 8.4 | 50 | 0.914 | 1.8 | 25 | 5.7 |
| A2-6 | Slurry | 65 | 321 | TEA 100 | $C_4$ 6.0 | $C'_4$ 6.14 | 3.2 | 14 | 50 | 0.925 | 1.8 | 13 | 5.3 |
| A2-7 | Solution | 1 | 26.5 | DEAC 2.5 | $C_7$ 0.3 | 4-MP-1 0.05 | 0.9 | 20 | 140 | 0.923 | 1.8 | 10 | 3.6 |
| A2-8 | Slurry | 65 | 315 | TEA 100 | $C_4$ 6.0 | $C'_4$ 6.14 | 2.6 | 8.5 | 50 | 0.914 | 1.6 | 25 | 5.5 |
| A2-9 | Slurry | 65 | 118 | TEA 100 | $C_4$ 6.0 | $C'_4$ 6.14 | 4.6 | 17 | 50 | 0.929 | 1.6 | 10 | 5.3 |
| A2-10 | Solution | 1 | 24.5 | DEAC 2.5 | $C_7$ 0.3 | $C'_6$ 0.025 | 0.9 | 20 | 140 | 0.918 | 1.8 | 13 | 3.8 |

Note
TEA = Triethyl aluminum
DEAC = Diethyl aluminum chloride
4-MP-1 = 4-Methylpentene-1
$C'_2$ = Ethylene
$C_4$ = n-Butane
$C'_4$ Butene-1
$C'_6$ = Hexene-1
$C_7$ = n-Heptane

TABLE 4

| No. | Polymerization method | Polymerization vessel capacity (l) | Catalyst quantity (mg) | Co-catalyst (mmol) | Solvent (kg) | α-olefin (kg) | $H_2$ partial pressure (kg/cm²) | $C'_2$ partial pressure (kg/cm²) | Polymerization temperature (°C.) | Density (g/cm³) | [η] (dl/g) | S.C.B. | $\overline{Mw}/\overline{Mn}$ |
|---|---|---|---|---|---|---|---|---|---|---|---|---|---|
| B2-1 | Slurry | 65 | 348 | TEA 100 | $C_4$ 15.2 | $C'_4$ 1.0 | 12 | 3.0 | 70 | 0.943 | 0.51 | 15 | 5.9 |
| B2-2 | Solution | 1 | 26.5 | DEAC 2.5 | $C_7$ 0.28 | 4-MP-1 0.03 | 3.0 | 10 | 140 | 0.938 | 0.50 | 13 | 3.5 |
| B2-3 | Slurry | 65 | 405 | TEA 50 | $C_4$ 15.2 | $C'_4$ 1.6 | 8.8 | 5.0 | 70 | 0.935 | 0.73 | 20 | 5.9 |
| B2-4 | Slurry | 65 | 421 | TEA 50 | $C_4$ 15.2 | $C'_4$ 1.6 | 12 | 3.0 | 70 | 0.929 | 0.54 | 25 | 5.9 |
| B2-5 | Slurry | 65 | 407 | TEA 100 | $C_4$ 12.0 | $C'_4$ 2.5 | 12 | 3.0 | 50 | 0.910 | 0.51 | 35 | 6.0 |
| B2-6 | Solution | 1 | 25.7 | DEAC 2.5 | $C_7$ 0.25 | 4-MP-1 0.05 | 2.5 | 10 | 140 | 0.912 | 0.52 | 22 | 3.6 |
| B2-7 | Slurry | 65 | 245 | DEAC 2.5 | $C_4$ 15.2 | $C'_4$ 0.3 | 12 | 1.0 | 50 | 0.931 | 0.25 | 25 | 5.9 |
| B2-8 | Slurry | 65 | 420 | TEA 50 | $C_4$ 15.2 | $C'_4$ 1.2 | 12 | 3.0 | 70 | 0.938 | 0.50 | 18 | 5.4 |
| B2-9 | Solution | 1 | 23.9 | DEAC 2.5 | $C_7$ 0.30 | $C'_6$ 0.017 | 3.0 | 10 | 140 | 0.937 | 0.52 | 18 | 3.4 |

Note
TEA = Triethyl aluminum
DEAC = Diethyl aluminum chloride
4-MP-1 = 4-methylpentene-1
$C'_2$ = Ethylene
$C_4$ = n-Butane
$C'_4$ = Butene-1
$C'_6$ = Hexene-1
$C_7$ = n-Heptane

EXAMPLE 6

A composition of ethylene-α-olefin copolymers was prepared in two stage polymerization.

The first stage polymerization was carried out for 90 min. by using the catalyst produced in Example 1 and triethyl aluminum (co-catalyst) and employing other polymerization conditions as shown in Table 5. Successively, the second stage polymerization was conducted for 123 min. by changing only the hydrogen partial pressure and the ethylene partial pressure as shown in Table 5. In both polymerization stages, the liquid phase molar ratio of ethylene/butene-1/hydrogen was maintained at respective fixed levels. The polymerized quantities in each stage were examined from the quantities of fed ethylene. The result indicated that the total polymer consisted of about 45% by weight of higher molecular weight components and about 55% by weight of lower molecular weight components. The sample polymer of the former stage was taken out immediately before the completion of the polymerization and was measured for its density, intrinsic viscosity, S.C.B. and (weight average molecular weight/number average molecular weight). Also, similar measurements were made for the whole polymer obtained after the two-stage polymerization. Using the values of the former stage polymer and the whole polymer, the intrinsic viscosity and S.C.B. for the polymer formed in the latter stage alone were calculated. These calculated values are also shown in Table 5. The whole polymer gave: density 0.920 g/cm³, melt index 0.7 g/10 min, melt flow ratio 65, intrinsic viscosity 1.6 dl/g, S.C.B. 25. The whole polymer was measured for its fluidity and solid physical properties. Results are shown in Table 9.

The below-described are mixing methods of an ethylene-α-olefin copolymer A having a relatively higher molecular weight and an ethylene-α-olefin copolymer B having a relatively lower molecular weight.

(a) Mixing with a Banbury mixer (hereinafter referred to as Banbury mixing)

A copolymer A and a copolymer B are mixed in a fixed ratio and in order to give a total quantity of 1.0 kg. The mixture is kneaded in a Banbury mixer for 5 min. with a rotor revolution of 150 to 230 rpm. At that time, nitrogen replacement should be made sufficiently and the polymer temperature must not exceed 250° C.

(b) Mixing in a solution state (hereinafter referred to as solution mixing)

A copolymer A and a copolymer B are mixed in a fixed ratio and in order to give a total quantity of 100 g. This mixture is charged into a 3 liter autoclave. Two liters of xylene is added as a solvent. With stirring, the mixture is heated up to 200° C. and is subjected to 1 hour of solution mixing. Then, it is cooled below the boiling point, and is added into 10 liters of methanol to cause precipitation. The precipitate is dried for 48 hours in a vacuum drier of 80° C. to obtain an intended polymer composition.

EXAMPLE 7 tained at respective fixed levels. The polymerized quantities in each stage were examined from the quantities of fed ethylene. The result indicated that the total polymer consisted of about 50% by weight of higher molecular weight components and about 50% by weight of lower molecular weight components. The sample polymer of the former stage was taken out immediately before the completion of the polymerization and was measured for its density, intrinsic viscosity, S.C.B. and (weight average molecular weight/number average molecular weight). Similar measurements were made also for the whole polymer obtained after the two stage polymerization. Using the values of the former stage polymer and the whole polymer, the intrinsic viscosity and S.C.B. for the polymer formed in the latter stage alone were calculated. These calculated values are also shown in Table 6. The whole polymer gave: density 0.923 g/cm$^3$, melt index 6 g/10 min., melt flow ratio 55, intrinsic viscosity 1.10 dl/g, S.C.B. 25. The whole polymer was subjected to injection molding and the molded composition was measured for its physical properties. Results are shown in Table 10.

TABLE 5

| No. | Polymerization method | Polymerization vessel capacity (l) | Catalyst quantity (mg) | cocatalyst TEA (mg) | Solvent (g) | α-olefin (g) | H$_2$ partial pressure (kg/cm$^2$) | C'$_2$-partial pressure (kg/cm$^2$) | Polymerization temperature (°C.) | Polymerization time (min) | Density (g/cm$^3$) | [η] (dl/g) | S.C.B. | $\overline{Mw}/\overline{Mn}$ |
|---|---|---|---|---|---|---|---|---|---|---|---|---|---|---|
| 1st stage | Slurry | | | | | | 0.3 | 3 | | 90 | 0.902 | 2.8 | 35 | 6.1 |
| | | 5 | 18.5 | 5 | C$_4$ 1000 | C'$_4$ 250 | | | 50 | | | | | |
| 2nd stage | Slurry | | | | | | 1.7 | 8 | | 123 | — | (0.62) | (15) | — |

Note
C$_4$ = n-Butane
C'$_4$ = Butene-1
C'$_2$ = Ethylene
TEA = Triethyl aluminum
Values in parenthesis are calculated values.

TABLE 6

| No. | Polymerization method | Polymerization vessel capacity (l) | Catalyst quantity (mg) | Cocatalyst TEA (mg) | Solvent (g) | α-olefin (g) | H$_2$ partial pressure (kg/cm$^2$) | C'$_2$-partial pressure (kg/cm$^2$) | Polymerization temperature (°C.) | Polymerization time (min) | Density (g/cm$^3$) | [η] (dl/g) | S.C.B. | $\overline{Mw}/\overline{Mn}$ |
|---|---|---|---|---|---|---|---|---|---|---|---|---|---|---|
| 1st stage | Slurry | | | | | | 0.45 | 20 | | 100 | 0.910 | 1.75 | 30 | 5.8 |
| | | 5 | 25 | 5 | C$_4$ 1000 | C'$_4$ 120 | | | 50 | | | | | |
| 2nd stage | Slurry | | | | | | 16 | 4.0 | | 150 | — | (0.5) | (20) | — |

Note
C$_4$ = n-Butane
C'$_4$ = Butene-1
C'$_2$ = Ethylene
TEA = Triethyl aluminum
Values in parenthesis are calculated values.

A composition of ethylene-α-olefin copolymers was prepared in two stage polymerization.

The first stage polymerization was carried out for 100 min. by using the catalyst produced in Example 1 and triethyl aluminum (co-catalyst) and employing other polymerization conditions as shown in Table 6. Successively, the second stage polymerization was conducted for 150 min. by changing only the hydrogen partial pressure and the ethylene partial pressure as shown in Table 6. In both polymerization stages, the liquid phase molar ratio of ethylene/butene-1/hydrogen was main-

EXAMPLE 8

The ethylene-α-olefin copolymer A1-1 obtained in Example 2 and the ethylene-α-olefin copolymer B1-1 obtained in Example 3 were mixed at a 50/50 weight ratio and kneaded in a Banbury mixer. A composition having a density, MI and MFR shown in Table 7 was prepared. Physical properties of the composition are also shown in Table 7. For the purpose of comparison, in Table 7 are also shown Comparative example 1 using a high pressure polyethylene based on the conventional technique (commercial product: Sumikathene ®F101-1 manufactured by Sumitomo Chemical Co., Ltd.) as well as Comparative example 2 using a low density ethylene-α-olefin copolymer of the conventional technique.

As is obvious from Table 7, the polymer composition of this invention is excellent, compared with the high pressure polyethylene, with its lower Brabender torque (excellent in processability) and higher tensile impact strength, ESCR, rigidity and tensile strength.

It is also obvious from Table 7 that, compared with the low density ethylene-α-olefin copolymer of the conventional technique, the polymer composition of this invention has a much lower Brabender torque (very excellent in processability) and a much higher tensile impact strength and tensile strength.

conventional technique, and further has a much higher tensile impact strength and ESCR.

EXAMPLES 10 TO 14

Ethylene-α-olefin copolymers A obtained in Example 2 and ethylene-α-olefin copolymers B obtained in Example 3 were mixed in various ratios and the compositions having densities, MIs and MFRs shown in Table 9 are obtained. Their physical properties were also shown in Table 9.

In Table 9 is also shown a similar composition obtained from two stage polymerization (Example 6). For the purpose of comparison, in Table 9 were also shown Comaprative examples 5, 6 and 7 as examples of low density ethylene-α-olefin copolymers of the conventional technique of which molecular weight distribu-

TABLE 7

| | | Copolymer A | | Copolymer B | | Properties of composition | | | |
| --- | --- | --- | --- | --- | --- | --- | --- | --- | --- |
| | Mixing method | Desig- nation | % by weight | Desig- nation | % by weight | Density (g/cm³) | MI (g/10 min) | MFR | Distribu- tion index of S.C.B.* |
| Example 8 | Banbury | A1-1 | 50 | B1-1 | 50 | 0.921 | 1.1 | 65 | 2.5 |
| Comparative Example 1 | — | — | — | — | — | 0.922 | 0.3 | 65 | — |
| Comparative Example 2 | — | — | — | — | — | 0.920 | 1.0 | 30 | — |

| | Physical properties of composition | | | | | |
| --- | --- | --- | --- | --- | --- | --- |
| | Tensile impact strength (kg-cm/cm²) | Olsen's flexural modulus (kg/cm²) | ESCR F$_{50}$ (hr) | Tensile strength (kg/cm²) | Brabender torque (kg · m) | Chlorine water resistance |
| Example 8 | 340 | 2600 | 1000 | 290 | 1.9 | 1 |
| Comparative Example 1 | 200 | 2200 | 30 | 180 | 2.2 | 5 |
| Comparative Example 2 | 230 | 3200 | 1000 | 250 | 2.9 | 2 |

*Distribution index of S.C.B. = (S.C.B. of copolymer A)/(S.C.B. of copolymer B)

EXAMPLE 9

The ethylene-α-olefin copolymer A2-1 obtained in Example 4 and the ethylene-α-olefin copolymer B2-1 obtained in Example 5 were mixed at a 50/50 weight ratio and kneaded in a Banbury mixer. A composition having a density, melt index and melt flow ratio shown in Table 8 was prepared. Physical properties of the composition are also shown in Table 8. For the purpose of comparison, in Table 8 are also shown Comparative example 3 using a high pressure method polyethylene based on the conventional technique (commercial product: Sumikathene ®G 701 manufactured by Sumitomo Chemical Co., Ltd.) as well as Comparative example 4 using a low density ethylene-α-olefin copolymer of the conventional technique. As is obvious from Table 8, the polymer composition of this invention has a better fluidity at injection molding than the high pressure polyethylene and, moreover, has a much higher tensile impact strength, rigidity, ESCR and tensile strength. Also, the polymer composition of the present invention is largely excellent in fluidity at injection molding, compared with the low density ethylene-α-olefin copolymer of the tions are made wider and of which lower molecular weight components have larger S.C.B. and of which higher molecular weight components have smaller S.C.B.

As is obvious from Table 9, in the compositions of this invention, S.C.B. in higher molecular weight components is more than or about equal to that in lower molecular weight components as seen in distribution index of S.C.B. (compare Examples 6, 10 and 14 with Comparative examples 5 and 6, and Example 13 with Comparative example 7). Therefore, the compositions of this invention have much higher tensile impact strengths and tensile strengths than the comparative compositions of the conventional technique do. By comparison of Comparative example 2 in Table 7 with Comparative example 5 in Table 9, it is seen that widening of molecular weight distribution in the manufacture of a low density ethylene-α-olefin copolymer of the conventional technique maintaining density and MI (larger MFR gives wider distribution) results in large reduction in tensile impact strength and tensile strength.

TABLE 8

| | | Copolymer A | | Copolymer B | | Properties of composition | | | |
| --- | --- | --- | --- | --- | --- | --- | --- | --- | --- |
| | Mixing method | Desig- nation | % by weight | Desig- nation | % by weight | Density (g/cm³) | MI (g/10 min) | MFR | Distribu- tion index of S.C.B.* |
| Example 9 | Banbury | A2-1 | 50 | B2-1 | 50 | 0.924 | 5 | 50 | 2.5 |
| Comparative Example 3 | — | — | — | — | — | 0.920 | 6 | 35 | — |
| Comparative | — | — | — | — | — | 0.924 | 5 | 30 | — |

TABLE 8-continued

Example 4

| | Tensile impact strength (kg-cm/cm$^2$) | Olsen's flexural modulus (kg/cm$^2$) | ESCR F$_{50}$ (hr) | Tensile strength (kg/cm$^2$) | Spinal blow length (mm) |
|---|---|---|---|---|---|
| Example 9 | 190 | 2900 | 100 | 220 | 130 |
| Comparative Example 3 | 120 | 2100 | 2 | 150 | 120 |
| Comparative Example 4 | 110 | 3500 | 30 | 180 | 80 |

*Distribution index of S.C.B. = (S.C.B. of copolymer A)/(S.C.B. of copolymer B)

TABLE 9

| | Mixing method | Copolymer A Designation | Copolymer A % by weight | Copolymer B Designation | Copolymer B % by weight | Properties of composition Density (g/cm$^3$) | MI (g/10 min) | MFR | Distribution index of S.C.B.* |
|---|---|---|---|---|---|---|---|---|---|
| Example 6 | Two stage polymerization | | | | | 0.920 | 0.7 | 65 | (2.3) |
| Example 10 | Solution | A1-2 | 60 | B1-2 | 40 | 0.920 | 0.5 | 70 | 1.8 |
| Example 11 | Banbury | A1-3 | 50 | B1-3 | 50 | 0.920 | 0.25 | 80 | 1.5 |
| Example 12 | " | A1-4 | 50 | B1-4 | 50 | 0.920 | 0.8 | 50 | 0.7 |
| Example 13 | " | A1-11 | 50 | B1-9 | 50 | 0.929 | 1.2 | 70 | 3.8 |
| Example 14 | Solution | A1-13 | 60 | B1-12 | 40 | 0.919 | 0.5 | 70 | 1.7 |
| Comparative Example 5 | Banbury | A1-7 | 50 | B1-6 | 50 | 0.920 | 1.1 | 65 | 0.37 |
| Comparative Example 6 | Solution | A1-8 | 60 | B1-7 | 40 | 0.919 | 0.5 | 70 | 0.50 |
| Comparative Example 7 | Banbury | A1-12 | 50 | B1-10 | 50 | 0.930 | 1.2 | 70 | 0.36 |

| | Physical properties of composition | | | |
|---|---|---|---|---|
| | Tensile impact strength (kg-cm/cm$^2$) | Olsen's flexural modulus (kg/cm$^2$) | Tensile strength (kg/cm$^2$) | Tackiness |
| Example 6 | 370 | 2700 | 300 | o |
| Example 10 | 480 | 2600 | 320 | o |
| Example 11 | 480 | 2700 | 320 | o |
| Example 12 | 300 | 2900 | 260 | o |
| Example 13 | 250 | 3700 | 250 | o |
| Example 14 | 500 | 2500 | 310 | o |
| Comparative Example 5 | 110 | 3200 | 180 | x |
| Comparative Example 6 | 200 | 3100 | 200 | x |
| Comparative Example 7 | 70 | 4500 | 200 | o |

*Distribution index of S.C.B. = $\frac{\text{(S.C.B. of copolymer A)}}{\text{(S.C.B. of copolymer B)}}$

EXAMPLES 15 TO 17

Ethylene-α-olefin copolymers A obtained in Example 4 and ethylene-α-olefin copolymers B obtained in Example 5 were mixed in various ratios and the compositions having densities, melt indices and melt flow ratios shown in Table 10 were obtained. Their physical properties are also shown in Table 10.

In Table 10 is also shown a similar composition obtained from two stage polymerization (Example 7). For the purpose of comparison, in Table 10 were also shown Comparative examples 8, 9 and 10 as examples of low density ethylene-α-olefin copolymers of the conventional technique of which molecular weight distributions are made wider, and of which lower molecular weight components have larger S.C.B. and of which higher molecular weight components have smaller S.C.B.

As is obvious from Table 10, in the compositions of this invention, the higher molecular weight components have larger S.C.B. than the lower molecular weight components do, as seen in distribution index of S.C.B. (compare Examples 7, 15, 16 with Comparative examples 8 and 9, and Example 17 with Comparative example 10). Therefore, the compositions of this invention have much higher tensile impact strengths ESCRs and tensile strengths than the comparative compositions of the conventional technique do. By comparison of Comparative example 4 in Table 8 with Comparative example 9 in Table 10, it is seen that widening of molecular weight distribution in the manufacture of a low density ethylene-α-olefin copolymer of the conventional technique mainteining density and MI (larger MFR gives wider distribution) results in large reduction in tensile impact strength, ESCR and tensile strength.

EXAMPLES 18 TO 20

Ethylene-α-olefin copolymers A obtained in Example 2 and ethylene-α-olefin copolymers B obtained in Example 3 were mixed in various ratios and the compositions having densities, MIs and MFRs shown in Table 11 are obtained. Their physical properties were also shown in Table 11.

For the purpose of comparison, in Table 11 are also shown an example (Comparative example 1) of high pressure polyethylenes of the conventional technique; an example (Comparative example 11) of low density ethylene-α-olefin copolymers of the conventional technique of which molecular weight distributions are made wider, and of which lower molecular weight components have larger S.C.B. and of which higher molecular weight components have smaller S.C.B.; and an example (Comparative example 12, to be compared with Example 19) of ethylene-α-olefin copolymers compositions of which distribution indices of S.C.B. meet the object of this invention but of which lower molecular weight components have a too low intrinsic viscosity.

It is clearly seen from Table 11 that proper selection of distribution index of S.C.B. gives good transparency about equal to that of high pressure polyethylenes as well as a much more excellent tensile impact strength and tensile strength than those of high pressure polyethylenes.

It is learned from comparison of Example 19 with Comparative example 12 that a too low intrinsic viscosity of lower molecular weight components badly affects the tensile impact strength and transparency of the copolymer composition.

TABLE 10

| | Mixing method | Copolymer A Designation | Copolymer A % by weight | Copolymer B Designation | Copolymer B % by weight | Density (g/cm³) | MI (g/10 min) | MFR | Distribution index of S.C.B.* |
|---|---|---|---|---|---|---|---|---|---|
| Example 7 | Two stage polymerization | | | | | 0.923 | 6 | 55 | (1.5) |
| Example 15 | Solution | A2-2 | 50 | B2-2 | 50 | 0.923 | 5 | 50 | 1.5 |
| Example 16 | " | A2-3 | 30 | B2-3 | 70 | 0.924 | 3 | 60 | 1.5 |
| Example 17 | Banbury | A2-8 | 45 | B2-8 | 55 | 0.929 | 10 | 45 | 1.4 |
| Comparative Example 8 | Solution | A2-7 | 50 | B2-6 | 50 | 0.922 | 5 | 50 | 0.45 |
| Comparative Example 9 | Banbury | A2-4 | 50 | B2-5 | 50 | 0.920 | 5 | 50 | 0.49 |
| Comparative Example 10 | " | A2-9 | 45 | B2-4 | 55 | 0.930 | 10 | 45 | 0.40 |

| | Tensile impact strength (kg-cm/cm²) | Olsen's flexural modulus (kg/cm²) | ESCR $F_{50}$ (hr) | Tensile strength (kg/cm²) | Tackiness |
|---|---|---|---|---|---|
| Example 7 | 170 | 3000 | 50 | 220 | o |
| Example 15 | 240 | 3000 | 100 | 250 | o |
| Example 16 | 190 | 3000 | 30 | 230 | o |
| Example 17 | 120 | 4000 | 5 | 200 | o |
| Comparative Example 8 | 100 | 3600 | 15 | 150 | x |
| Comparative Example 9 | 80 | 3200 | 13 | 130 | x |
| Comparative Example 10 | 40 | 4500 | 1 | 110 | o |

*Distribution index of S.C.B. = $\frac{\text{(S.C.B. of copolymer A)}}{\text{(S.C.B. of copolymer B)}}$

TABLE 11

| | Mixing method | Copolymer A Designation | Copolymer A % by weight | Copolymer B Designation | Copolymer B % by weight | Density (g/cm³) | MI (g/10 min) | MFR | Distribution index of S.C.B.* |
|---|---|---|---|---|---|---|---|---|---|
| Example 18 | Solution | A1-5 | 30 | B1-5 | 70 | 0.920 | 0.15 | 100 | 1.0 |
| Example 19 | " | A1-6 | 50 | B1-11 | 50 | 0.920 | 0.8 | 50 | 1.0 |
| Example 20 | Banbury | A1-1 | 50 | B1-4 | 50 | 0.916 | 1.1 | 65 | 1.6 |
| Comparative Example 1 | — | — | — | — | — | 0.922 | 0.3 | 65 | — |
| Comparative Example 11 | Banbury | A1-9 | 50 | B1-6 | 50 | 0.920 | 0.8 | 50 | 0.4 |
| Comparative Example 12 | " | A1-10 | 65 | B1-8 | 35 | 0.920 | 0.8 | 50 | 1.0 |

| | Tensile impact strength (kg-cm/cm²) | Olsen's flexural modulus (kg/cm²) | Tensile strength (kg/cm²) | Tackiness | Haze (%) |
|---|---|---|---|---|---|
| Example 18 | 480 | 2800 | 320 | o | 5 |
| Example 19 | 400 | 2800 | 250 | o | 5 |
| Example 20 | 420 | 2100 | 250 | o | 5 |
| Comparative Example 1 | 200 | 2200 | 180 | o | 5 |
| Comparative Example 11 | 150 | 3300 | 200 | x | 12 |
| Comparative Example 12 | 130 | 2800 | 220 | o | 15 |

*Distribution index of S.C.B. = (S.C.B. of copolymer A)/(S.C.B. of copolymer B)

EXAMPLES 21, 22, 23

Ethylene-α-olefin copolymers A obtained in Example 4 and ethylene-α-olefin copolymers B obtained in Example 5 were mixed at various ratios, and the compositions having densities, MIs and MFRs shown in Table 12 are obtained. Their physical properties were also shown in Table 12. For the purpose of comparison, in Table 12 are also shown Comparative example 3 using a high pressure polyethylene of the conventional technique; Comparative example 13 using a composition of low density ethylene-α-olefin copolymers of the conventional technique of which molecular weight distribution is made wider and of which lower molecular weight components have more S.C.B. and of which higher molecular weight components have less S.C.B.; and Comparative example 14 (to be compared with Co., Ltd.) was measured for its physical properties and subjected to blow molding.

Results are shown in Table 7 and 11.

COMPARATIVE EXAMPLE 2

An ethylene-α-olefin copolymer of the conventional technique was synthesized employing polymerization conditions as shown in Table 13 in which the catalyst prepared in Example 1 and triethyl aluminum (co-catalyst) were used. The copolymer gave: density 0.920 g/cm$^3$, MI 1.0 g/10 min., MFR 30. Its physical properties are shown in Table 7.

TABLE 13

| Polymerization method | Polymerization vessel capacity (l) | Catalyst quality (mg) | Co-Catalyst TEA (mmol) | Solvent (kg) | α-olefin (kg) | $H_2$ partial pressure (kg/cm$^2$) | $C_2'$ partial pressure (kg/cm$^2$) | Polymerization temperature (°C.) | Polymerization time (min) |
|---|---|---|---|---|---|---|---|---|---|
| Slurry | 65 | 197 | 100 | $C_4$ 7.0 | $C_4'$ 7.16 | 4.2 | 10 | 50 | 100 |

Note:
TEA = Triethyl aluminum
$C_2'$ = Ethylene
$C_4$ = n-Butane
$C_4'$ = Butene-1

Example 22) using a composition of ethylene-α-olefin copolymers of which distribution index of S.C.B. meets the scope of the present invention but of which lower molecular weight components have a too low intrinsic viscosity. It is obvious from Table 12 that proper selection of distribution index of S.C.B. gives good transparency about equal to that of high pressure polyethylenes and much more excellent tensile impact strength, tensile strength and ESCR than those of high pressure polyethylenes. From comparison of Example 22 with Comparative example 14, it is learned that a too low intrinsic viscosity of lower molecular weight components badly affects tensile impact strength and transparency.

COMPARATIVE EXAMPLE 3

A commercial high pressure polyethylene (Sumikathene®G701 manufactured by Sumitomo Chemical Co., Ltd.) was measured for its physical properties and subjected to injection molding.

Results are shown in Table 8 and 12.

COMPARATIVE EXAMPLE 4

A low density ethylene-α-olefin copolymer of the conventional technique was synthesized employing polymerization conditions shown in Table 14 in which the catalyst prepared in Example 1 and triethyl alumi-

TABLE 12

| | | Copolymer A | | Copolymer B | | Properties of composition | | | |
|---|---|---|---|---|---|---|---|---|---|
| | Mixing method | Designation | % by weight | Designation | % by weight | Density (g/cm$^3$) | MI (g/10 min) | MFR | Distribution index of S.C.B.* |
| Example 21 | Solution | A2-10 | 50 | B2-9 | 50 | 0.923 | 5 | 50 | 0.72 |
| Example 22 | Banbury | A2-5 | 50 | B2-4 | 50 | 0.922 | 5 | 50 | 1.0 |
| Example 23 | " | A2-1 | 50 | B2-4 | 50 | 0.920 | 5 | 50 | 1.6 |
| Comparative Example 13 | " | A2-6 | 50 | B2-5 | 50 | 0.923 | 5 | 50 | 0.37 |
| Comparative Example 14 | " | A2-8 | 65 | B2-7 | 35 | 0.922 | 5 | 50 | 1.2 |
| Comparative Example 3 | — | — | — | — | — | 0.920 | 6 | 35 | — |

| | Physical properties of composition | | | | | |
|---|---|---|---|---|---|---|
| | Tensile impact strength (kg-cm/cm$^2$) | Olsen's flexural modulus (kg/cm$^2$) | ESCR $F_{50}$ (kg/cm$^2$) | Tensile strength | Tackiness | Haze (%) |
| Example 21 | 200 | 3100 | 20 | 250 | o | 7 |
| Example 22 | 170 | 2900 | 30 | 220 | o | 7 |
| Example 23 | 260 | 2500 | 200 | 230 | o | 7 |
| Comparative Example 13 | 50 | 3600 | 10 | 130 | x | 12 |
| Comparative Example 14 | 80 | 3200 | 30 | 190 | o | 12 |
| Comparative Example 3 | 120 | 2100 | 2 | 150 | o | 7 |

*Distribution index of S.C.B. = (S.C.B. of copolymer A)/(S.C.B. of copolymer B)

COMPARATIVE EXAMPLE 1

A commercial high pressure polyethylene (Sumikathene®F101-1 manufactured by Sumitomo Chemical num (co-catalyst) were used. The copolymer gave: density 0.924 g/cm$^3$, melt index 5 g/10 min., melt flow ratio 30. Its physical properties are shown in Table 8.

TABLE 14

| Polymerization method | Polymerization vessel capacity (l) | Catalyst quality (mg) | Co-Catalyst TEA (mmol) | Solvent (kg) | α-olefin (kg) | H₂ partial pressure (kg/cm²) | C₂' partial pressure (kg/cm²) | Polymerization temperature (°C.) | Polymerization time (min) |
|---|---|---|---|---|---|---|---|---|---|
| Slurry | 65 | 199 | 25 | C₄ 6.0 | C₄' 6.14 | 10.2 | 11.3 | 50 | 90 |

Note:
TEA = Triethyl aluminum
C₂' = Ethylene
C₄ = n-Butane
C₄' = Butene-1

COMPARATIVE EXAMPLES 5, 6, 7 AND 11

Compositions of ethylene-α-olefin copolymers of the conventional technique were prepared by blending ethylene-α-olefin copolymers A obtained in Example 2 and ethylene-α-olefin copolymers B obtained in Example 3 at ratios shown in Table 9 or 11. However in these copolymer compositions, molecular weight distributions are made wider and lower molecular weight components have larger S.C.B. and higher molecular weight components have smaller S.C.B. Densities, MIs, MFRs and physical properties of these compositions are shown in Table 9 or 11.

COMPARATIVE EXAMPLE 12

By blending an ethylene-α-olefin copolymer A obtained in Example 2 and an ethylene-α-olefin copolymer B obtained in Example 3 at a mixing ratio shown in Table 11, a composition of ethylene-α-olefin copolymers was prepared of which distribution index of S.C.B. meets the scope of the present invention but of which lower molecular weight components have a too low intrinsic viscosity. Its density, MI, MFR and physical properties are shown in Table 11.

COMPARATIVE EXAMPLES 8, 9, 10 AND 13

Compositions of ethylene-α-olefin copolymers of the conventional technique were prepared by blending ethylene-α-olefin copolymers A obtained in Example 4 and ethylene-α-olefin copolymers B obtained in Example 5 at mixing ratios shown in Table 10 or 12. However in these compositions, molecular weight distributions are made wider and lower molecular weight components have larger S.C.B. and higher molecular weight components have smaller S.C.B. Densities, MIs, MFRs and physical properties of these compositions are shown in Table 10 or 12.

COMPARATIVE EXAMPLE 14

By blending an ethylene-α-olefin copolymer A obtained in Example 4 and an ethylene-α-olefin copolymer B obtained in Example 5 at a mixing ratio shown in Table 12, a composition of ethylene-α-olefin copolymers was prepared of which distribution index of S.C.B. meets the scope of this invention but of which lower molecular weight components have too low an intrinsic viscosity. Its density, MI, MFR and physical properties are shown in Table 12.

EXAMPLE 24

Ethylene-α-olefin copolymers A were polymerized using the catalyst produced in Example 1 and organoaluminum compounds (co-catalyst) and employing α-olefins and other polymerization conditions as shown in Table 15. Their densities, intrinsic viscosities, S.C.B. and (weight average molecular weight/number average molecular weight) are shown in Table 15.

These polymers are used in the following examples as mixing components.

TABLE 15

| No. | Polymerization method | Polymerization vessel capacity (l) | Catalyst quantity (mg) | Co-catalyst (mmol) | | Solvent (kg) | | α-olefin (kg) | |
|---|---|---|---|---|---|---|---|---|---|
| A3-1 | Slurry | 65 | 131 | TEA | 100 | C₄ | 6.0 | C₄' | 6.14 |
| A3-2 | Solution | 1 | 25.1 | DEAC | 2.5 | C₇ | 0.22 | 4-MP-1 | 0.130 |
| A3-3 | " | 1 | 24.8 | " | | C₇ | 0.30 | C₆' | 0.055 |
| A3-4 | Slurry | 65 | 307 | TEA | 100 | C₄ | 6.0 | C₄' | 6.14 |
| A3-5 | " | 65 | 130 | TEA | 50 | " | | " | |
| A3-6 | " | 65 | 125 | " | | " | | " | |
| A3-7 | " | 65 | 301 | TEA | 100 | " | | " | |
| A3-8 | " | 65 | 318 | " | | " | | " | |
| A3-9 | " | 65 | 308 | " | | " | | " | |

| No. | H₂ partial pressure (kg/cm²) | C₂'- partial pressure (kg/cm²) | Polymerization temperature (°C.) | Properties Density (g/cm³) | [η] (dl/g) | S.C.B. | M̄w/M̄n |
|---|---|---|---|---|---|---|---|
| A3-1 | 0.45 | 5.0 | 50 | 0.899 | 2.6 | 38 | 5.9 |
| A3-2 | 0.10 | 20 | 140 | 0.899 | 2.6 | 27 | 3.5 |
| A3-3 | 0.10 | 20 | 140 | 0.902 | 2.6 | 24 | 3.7 |
| A3-4 | 0.9 | 9.0 | 50 | 0.914 | 2.4 | 22 | 6.0 |
| A3-5 | 0.22 | 5.5 | 50 | 0.906 | 3.2 | 28 | 5.8 |
| A3-6 | 1.8 | 18 | 50 | 0.923 | 2.6 | 9 | 5.5 |
| A3-7 | 1.2 | 12 | 50 | 0.919 | 2.4 | 16 | 5.8 |
| A3-8 | 2.0 | 20 | 50 | 0.928 | 2.4 | 8 | 5.4 |

TABLE 15-continued

| A3-9 | 1.4 | 9.0 | 50 | 0.914 | 2.2 | 22 | 5.7 |

Note
TEA = triethyl aluminum
DEAC = Deithyl aluminum chloride
4-MP-1 = 4-Methylpenetene
$C_2'$ = Ethylene
$C_4$ = n-Butane
$C_4'$ = Butene-1
$C_6'$ = Hexene-1
$C_7$ = n-Heptane

EXAMPLE 25

Ethylene-α-olefin copolymers B were polymerized using the catalyst produced in Example 1 and organoaluminum compounds (co-catalyst) and employing α-olefins and other polymerization conditions shown in Table 16. Their densities, intrinsic viscosities, S.C.B. and (weight average molecular weight/number average molecular weight) are shown in Table 16.

These copolymers are used in the following examples as mixing components.

TABLE 16

| No. | Polymerization method | Polymerization vessel capacity (l) | Catalyst quantity (mg) | Co-catalyst (mmol) | Solvent (kg) | α-olefin (kg) |
|---|---|---|---|---|---|---|
| B3-1 | Slurry | 65 | 405 | TEA 50 | $C_4$ 12.0 | $C_4'$ 2.0 |
| B3-2 | Solution | 1 | 25.5 | DEAC 2.5 | $C_7$ 0.30 | 4-MP-1 0.025 |
| B3-3 | " | 1 | 24.2 | DEAC 2.5 | $C_7$ 0.32 | $C_6'$ 0.013 |
| B3-4 | Slurry | 65 | 330 | TEA 100 | $C_4$ 15.2 | $C_4'$ 0.7 |
| B3-5 | " | 65 | 391 | TEA 100 | " | $C_4'$ 1.8 |
| B3-6 | " | 65 | 408 | TEA 100 | $C_4$ 12.0 | $C_4'$ 4.0 |
| B3-7 | " | 65 | 350 | TEA 100 | $C_4$ 15.2 | $C_4'$ 1.3 |
| B3-8 | " | 65 | 405 | TEA 50 | " | $C_4'$ 1.6 |
| B3-9 | " | 65 | 390 | TEA 100 | " | $C_4'$ 0.20 |

| No. | $H_2$ partial pressure (kg/cm$^2$) | $C_2'$- partial pressure (kg/cm$^2$) | Polymerization temperature (°C.) | Density (g/cm$^3$) | [η] (dl/g) | S.C.B. | $\overline{M_w}/\overline{M_n}$ |
|---|---|---|---|---|---|---|---|
| B3-1 | 10.8 | 8.3 | 70 | 0.942 | 0.83 | 15 | 5.5 |
| B3-2 | 2.4 | 10 | 140 | 0.943 | 0.81 | 10 | 3.7 |
| B3-3 | 2.4 | 10 | 140 | 0.940 | 0.82 | 12 | 3.8 |
| B3-4 | 7.5 | 5.0 | 70 | 0.949 | 0.75 | 11 | 5.3 |
| B3-5 | 7.2 | 8.0 | 70 | 0.941 | 0.92 | 14 | 5.4 |
| B3-6 | 5.2 | 4.0 | 50 | 0.910 | 0.82 | 35 | 5.9 |
| B3-7 | 7.5 | 5.0 | 70 | 0.942 | 0.75 | 16 | 5.8 |
| B3-8 | 8.8 | 5.0 | 70 | 0.935 | 0.24 | 20 | 5.9 |
| B3-9 | 15.0 | 1.5 | 70 | 0.949 | 0.27 | 11 | 5.6 |

Note
TEA = triethyl aluminum
DEAC = Deithyl aluminum chloride
4-MP-1 = 4-Methylpenetene
$C_2'$ = Ethylene
$C_4$ = n-Butane
$C_4'$ = Butene-1
$C_6'$ = Hexene-1
$C_7$ = n-Heptane

EXAMPLE 26

A composition of ethylene-α-olefin copolymers was prepared from a two stage polymerization. The first stage polymerization was carried out for 90 min. using the catalyst obtained in Example 1 and triethyl aluminum (co-catalyst) and employing other polymerization conditions shown in Table 17.

Successively the second stage polymerization was conducted for 150 min. by changing only the hydrogen partial pressure and the ethylene partial pressure as shown in table 17. In both stages, the liquid phase molar ratio of ethylene, butene-1 and hydrogen were kept at respective fixed levels. Polymerized quantities in each stage were calculated from quantities of fed ethylene. The total polymer consisted of about 50% by weight of lower molecular weight components. Immediately before the completion of the first stage polymerization, a part of the polymer formed was taken out as a polymer sample of the first stage and measured for its density, intrinsic viscosity, S.C.B. and (weight average molecular weight/number average molecular weight). Similar measurements were also made for the whole polymer of this two stage polymerization. From the values of the first stage polymer and the whole polymer, the intrinsic viscosity and S.C.B. of the polymer formed in the second stage along were calculated, and they are shown in Table 17. The whole polymer gave: density 0.919 g/cm$^3$, melt index 0.5 g/10 min., melt flow ratio 70, intrinsic viscosity 1.70 dl/g, S.C.B. 27. The flow characteristics and the solid physical properties of the whole polymer are shown in Table 19.

EXAMPLE 27

By mixing the ethylene-α-olefin copolymer A3-1 obtained in Example 24 and the ethylene-α-olefin copolymer B3-1 obtained in Example 25 at a 50/50 weight ratio and kneading the mixture in a Banbury mixer, a composition having the density, MI and MFR as shown ability is much better), a superior tensile impact strength and tensile strength.

TABLE 17

| No. | Polymerization method | Polymerization vessel capacity (l) | Catalyst quantity (mg) | Co-catalyst (mmol) | Solvent (kg) | α-olefin (kg) |
|---|---|---|---|---|---|---|
| 1st stage | Slurry | 5 | 24.3 | 5 | C₄ 1000 | C₄' 250 |
| 2nd stage | Slurry | | | | | |

| No. | H₂ partial pressure (kg/cm²) | C₂'- partial pressure (kg/cm²) | Polymerization temperature (°C.) | Polymerization time (min) | Density (g/cm³) | [η] (dl/g) | S.C.B. | $\overline{M_w}/\overline{M_n}$ |
|---|---|---|---|---|---|---|---|---|
| 1st stage | 0.4 | 3 | 50 | 90 | 0.900 | 2.6 | 37 | 5.8 |
| 2nd stage | 14 | 8 | | 150 | — | (0.8) | (17) | — |

Note
C₄ = n-Butane
TEA = Triethyl aluminum
C₄' = Butene-1
( ) = Calculated values
C₂' = Ethylene

TABLE 18

| | Mixing method | Copolymer A Designation | Copolymer A % by weight | Copolymer B Designation | Copolymer B % by weight | Properties of composition Density (g/cm³) | MI (g/10 min) | MFR | Distribution index of S.C.B.* |
|---|---|---|---|---|---|---|---|---|---|
| Example 27 | Banbury | A3-1 | 50 | B3-1 | 50 | 0.920 | 0.5 | 70 | 2.5 |
| Comparative Example 15 | — | — | — | — | — | 0.923 | 1.4 | 50 | — |
| Comparative Example 16 | — | — | — | — | — | 0.922 | 0.3 | 65 | — |
| Comparative Example 17 | — | — | — | — | — | 0.920 | 0.5 | 30 | — |

| | Physical properties of composition | | | | |
|---|---|---|---|---|---|
| | Tensile impact strength (kg-cm/cm²) | Olsen's flexural modulus (kg/cm²) | ESCR F₅₀ (hr) | Tensile strength (kg/cm²) | Brabonder torque (kg · m) |
| Example 27 | 450 | 2600 | >1000 | 320 | 2.0 |
| Comparative Example 15 | 130 | 2400 | 0.3 | 160 | 1.9 |
| Comparative Example 16 | 200 | 2200 | 30 | 180 | 2.2 |
| Comparative Example 17 | 280 | 3200 | >1000 | 260 | 3.5 |

*Distribution index of S.C.B. = $\frac{\text{(S.C.B. of copolymer A)}}{\text{(S.C.B. of copolymer B)}}$ in Table 18 was prepared. The physical properties of this composition are also shown in Table 18.

For the purpose of comparison, in Table 18 are also shown Comparative examples 15 and 16 using high pressure polyethylenes of the conventional technique (commercial products Sumikathene ®F208-1, F101-1 manufactured by Sumitomo Chemical Co., Ltd.) as well as Comparative example 17 using a low density ethylene-α-olefin copolymer of the conventional technique.

It is obvious from Table 18 that the copolymer composition of this invention has a Brabender torque about equal to those of high pressure polyethylenes (good in processability) and is quite excellent in tensile impact strength, rigidity, ESCR and tensile strength, compared with these polyethylenes.

When compared with the low density ethylene-α-olefin copolymer of the conventional technique, this composition has a much smaller Brabender torque (processability is much better), a superior tensile impact strength and tensile strength.

EXAMPLES 28 TO 31

Compositions having densities, MIs and MFRs shown in Table 19 were obtained, by blending ethylene-α-olefin copolymers A obtained in Example 24 and ethylene-α-olefin copolymers B obtained in Example 25 at mixing ratios as shown in Table 19. The physical properties of these compositions are shown in Table 19.

In Table 19 are also shown a composition of similar ethylene-α-olefin copolymers synthesized in two stage polymerization (Example 26) as well as, for comparison, ethylene-α-olefin copolymers compositions (Comparative examples 18, 19, 20) of which higher molecular weight components have smaller S.C.B. than lower molecular weight components do or have relatively few S.C.B. Also as shown in Table 19 an ethylene-α-olefin copolymers composition (Comparative example 21, to be compared with Examples 30 and 31) of which distribution index of S.C.B. meets the scope of the presetn invention but of which lower molecular weight components have too low an intrinsic viscosity.

As is obvious from Table 19, in the compositions of this invention, higher molecular weight components have larger S.C.B. than lower molecular weight components do. (Comparison should be made between Examples 26, 28 and 29 and Comparative example 18, and also between Example 30 and 31 and Comparative examples 19 and 20.) The compositions of this invention are also far superior in tensile impact strength and tensile strength to the Comparative examples.

is far superior to those of the high pressure polyethylenes, in dart impact strength, Elmendorf tear strengths (absolute value and MD/TD balance), tensile strength, heat-sealing characteristics, hot tack property and heat sealing strength in contaminated condition.

In the film of the composition prepared in Example 27, heat-sealing strength and heat sealing strength in contaminated condition had about same values, while, in the films of Comparative examples 15 and 16, heat sealing strength in contaminated condition were slightly lower than heat-sealing strength.

The measurement methods of the physical properties

TABLE 19

| | Mixing method | Copolymer A | | Copolymer B | | Properties of composition | | | | Tensile impact strength (kg-cm/cm²) | Olsen's flexural modulus (kg/cm²) | Tensile strength (kg/cm²) | Tackiness |
|---|---|---|---|---|---|---|---|---|---|---|---|---|---|
| | | Designation | % by weight | Designation | % by weight | Density (g/cm³) | MI (g/10 min.) | MFR | Distribution index of S.C.B.* | | | | |
| Example 26 | — | — | — | — | — | 0.919 | 0.5 | 70 | (2.2) | 470 | 2500 | 320 | o |
| Example 28 | Solution | A3-2 | 50 | B3-2 | 50 | 0.920 | 0.5 | 70 | 2.7 | 550 | 2600 | 340 | o |
| Example 29 | " | A3-3 | 50 | B3-3 | 50 | 0.920 | 0.5 | 70 | 2.0 | 520 | 2600 | 320 | o |
| Example 30 | Banbury | A3-4 | 50 | B3-4 | 50 | 0.929 | 0.8 | 50 | 2.0 | 300 | 4000 | 300 | o |
| Example 31 | Solution | A3-5 | 30 | B3-5 | 70 | 0.929 | 0.8 | 50 | 2.0 | 280 | 4000 | 290 | o |
| Comparative Example 18 | Banbury | A3-6 | 50 | B3-6 | 50 | 0.920 | 0.5 | 70 | 0.26 | 150 | 3300 | 210 | x |
| Comparative Example 19 | " | A3-7 | 50 | B3-7 | 50 | 0.929 | 0.8 | 50 | 1.0 | 200 | 4200 | 240 | o |
| Comparative Example 20 | " | A3-8 | 50 | B3-8 | 50 | 0.929 | 0.8 | 50 | 0.4 | 90 | 4500 | 200 | o |
| Comparative Example 21 | " | A3-9 | 65 | B3-9 | 35 | 0.929 | 0.8 | 50 | 2.0 | 120 | 4000 | 230 | o |

*Distribution index of S.C.B. = (S.C.B. of copolymer A)/(S.C.B. of copolymer B)

EXAMPLE 32

The composition prepared in Example 27 and the low density ethylene-α-olefin copolymer of the conventional technique used in Comparative example 17 were subjected to film processing under the following conditions.

Processing conditions
Extruder: Tanabe 30 mmφ extruder
Screw: Full flight L/D=28, C.R.=2.5
Die: Diameter 50 mm, die gap 2.0 mm
Temperature control: $C_1$ 170°, $C_2$ 220°, $C_3$ 220°, HD 220° C.
Screw revolution: 35 rpm
Output: 3.2 kg/hr
Blow up ratio: 2.5
Frost line height: 180 mm
Take-off speed: 5 m/min
Film thickness: 35μ

Also, the commercial high pressure polyethylenes used in Comparative examples 15 and 16 were subjected to film processing under the following conditions.
Die gap: 1.0 mm
Temperature control: $C_1$ 140°, $C_2$ 160°, $C_3$ 160°, HD 160° C.
(Other conditions were same as those applied above.)

In the case of the low density ethylene-α-olefin copolymer of the conventional technique used in Comparative example 17, a satisfactory film was not obtained with too much load put on the motor and with shark skin formed on the film surface.

In the cases of the composition prepared in Example 27 and the commercial high pressure polyethylenes used in Comparative examples 15 and 16, satisfactory films were obtained with no excessive motor loads. The physical properties of these films were shown in Table 20. The film of the composition prepared in Example 27 shown in table 20 are described below.
Dart impact strength: In accordance with ASTM D 1709A.
Elmendorf tear strength: In accordance with JIS Z 1702.
Tensile strength: In accordance with JIS K 6732-62
Heat-sealing characteristics: Heat-sealing strength of a film heat-sealed with a heat sealer of bar type. The maximum heat-sealing strength was obtained when pulled under conditions of film thickness of 35μ, width of 15 mm and pulling speed of 200 mm/min. after heat-sealing under sealing pressure of 1 kg/cm², 0.5 sec. and each incremental 5° C.
Hot tack property: A test sample (25 mm wide and 400 mm long) was folded into two, and the one end was fixed to the upper clamp and a stripping weight was placed on the other end. The area near the crease was inserted between heating bars and heat-sealed under a sealing pressure of 1 kg/cm² for 0.5 sec., and then the length of the stripped surface was measured.
Heat Sealing strength in contaminated condition: This is a test method for evaluating the heat-sealing characteristics in the condition that the heat-sealed surface is soiled with contents such as mayonaise, edible oils and flours. Specifically, a test film sample was folded in such a way that the surface soiled with an edible oil came inside, and was heat-sealed under the same conditions as used in heat-sealing characteristics. Then, its heat-sealing strength was measured.

COMPARATIVE EXAMPLE 15

A commercial high pressure polyethylene (Sumikathene ®F208-1 manufactured by Sumitomo Chemical Co., Ltd.) was subjected to measurement of physical properties and film processing. Results are shown in Tables 18 and 20.

COMPARATIVE EXAMPLE 16

A commercial high pressure polyethylene (Sumikathene®F 101-1 manufactured by Sumitomo Chemical Co., Ltd.) was subjected to measurements of physical properties and film processing. Results are shown in Tables 18 and 20.

COMPARATIVE EXAMPLE 17

COMPARATIVE EXAMPLE 21

By mixing an ethylene-α-olefin copolymer A obtained in Example 24 and an ethylene-α-olefin copolymer B obtained in Example 25 at a ratio as shown in Table 19, a composition of ethylene-α-olefin copolymers were prepared of which distribution index of S.C.B., meets the scope of this invention but of which lower molecular weight weight components have a too low intrinsic viscosity. Its density, MI, MFR and physical properties were shown in Table 19.

TABLE 20

|  | Dart impact strength (kg·cm/mm) | Elmenderf tear strength MD/TD (kg/cm) | Tensile strength MD/TD (kg/cm²) | Heat-sealing strength (kg/15mm width) | Hot tack property (mm) | Heat sealing strength in contaminated condition. |
|---|---|---|---|---|---|---|
| Example 27 | 700 | 120/150 | 450/410 | 1.5 | 1.0 | o |
| Comparative Example 15 | 270 | 80/50 | 250/210 | 0.7 | 4.0 | Δ |
| Comparative Example 16 | 250 | 70/70 | 280/250 | 0.7 | 3.0 | Δ |

TABLE 21

| Polymerization method | Polymerization vessel capacity (l) | Catalyst quantity (mg) | Co-catalyst TEA (mmol) | Solvent (kg) | α-olefin (kg) | $H_2$ partial pressure (kg/cm²) | $C'_2$ partial pressure (kg/cm²) | Polymerization temperature (°C.) | Polymerization time (min) |
|---|---|---|---|---|---|---|---|---|---|
| Slurry | 65 | 202 | 100 | $C_4$ 7.0 | $C'_4$ 7.16 | 3.0 | 10 | 50 | 90 |

Note
TEA = Triethyl aluminum
$C_4$ = n-Butane
$C'_4$ = Butene-1
$C'_2$ = Ethylene A low density ethylene-α-olefin copolymer of the conventional technique was synthesized, using the catalyst produced in Example 1 and triethyl aluminum (co-catalyst) and employing the other copolymerization conditions shown in Table 21. The copolymer gave: density 0.920 g/cm³, MI 0.5 g/10 min., MFR 30. The physical properties of this polymer are shown in Table 18.

COMPARATIVE EXAMPLES 18, 19, 20

Compositions of ethylene-α-olefin copolymers of the conventional technique were prepared, by mixing ethylene-α-olefin copolymers A obtained in Example 24 and ethylene-α-olefin copolymers B obtained in Example 25 at ratios shown in Table 19. In these compositions, molecular weight distributions are made wider and lower molecular weight components have larger S.C.B. and higher molecular weight components have smaller S.C.B. Densities, MIs, MFRs and physical properties of these compositions are shown in Table 19.

EXAMPLE 33

Ethylene-α-olefin copolymers A were synthesized using the catalyst produced in Example 1 and organo-aluminum compounds (co-catalyst) and employing α-olefins and other polymerization conditions as shown in Table 22. Densities, intrinsic viscosities, S.C.B. and (weight average molecular weight/number average molecular weight) of these copolymers are shown in Table 22.

These copolymers are used in the following examples as mixing components.

EXAMPLE 34

Ethylene-α-olefin copolymers B were synthesized using the catalyst produced in Example 1 and organo-aluminum compounds (co-catalyst) and employing α-olefins and other polymerization conditions as shown in Table 23. Densities, intrinsic viscosities, S.C.B. and (weight average molecular weight/number average molecular weight) of these copolymers are shown in Table 23.

These copolymers are used in the following examples as mixing components.

TABLE 22

| No. | Polymerization method | Polymerization vessel capacity (l) | Catalyst quantity (mg) | Co-catalyst (mmol) | Solvent (kg) | α-olefin (kg) | $H_2$ partial pressure (kg/cm²) | $C'_2$ partial pressure (kg/cm²) | Polymerization temperature (°C.) | Properties Density (g/cm³) | [η] (dl/g) | S.C.B. | $\overline{M}w/\overline{M}n$ |
|---|---|---|---|---|---|---|---|---|---|---|---|---|---|
| A4-1 | Slurry | 65 | 310 | TEA | $C_4$ 6.0 | $C'_4$ 6.14 | 0.70 | 7.8 | 50 | 0.912 | 2.6 | 24 | 5.6 |

TABLE 22-continued

| No. | Polymerization method | Polymerization vessel capacity (l) | Catalyst quantity (mg) | Co-catalyst (mmol) | Solvent (mg) | α-olefin (kg) | $H_2$ partial pressure (kg/cm$^2$) | $C'_2$- partial pressure (kg/cm$^2$) | Polymerization temperature (°C.) | Density (g/cm$^3$) | [η] (dl/g) | S.C.B. | $\overline{M}w/\overline{M}n$ |
|---|---|---|---|---|---|---|---|---|---|---|---|---|---|
| A4-2 | Solution | 1 | 24.3 | DEAC 2.5 | $C_7$ 0.27 | 4-MP-1 0.090 | 0.15 | 20 | 140 | 0.912 | 2.5 | 17 | 3.4 |
| A4-3 | Slurry | 65 | 83 | TEA 50 | $C_4$ 6.0 | $C'_4$ 6.14 | 0.09 | 7.0 | 50 | 0.912 | 4.4 | 20 | 5.8 |
| A4-4 | " | 65 | 309 | TEA 100 | " | " | 1.2 | 3.0 | 50 | 0.911 | 2.2 | 25 | 5.7 |
| A4-5 | " | 65 | 145 | TEA 50 | " | " | 0.59 | 6.7 | 50 | 0.906 | 2.6 | 29 | 5.8 |
| A4-6 | Solution | 1 | 25.2 | DEAC 2.5 | $C_7$ 0.30 | $C'_6$ 0.035 | 0.2 | 20 | 140 | 0.909 | 2.2 | 18 | 3.4 |
| A4-7 | Slurry | 65 | 303 | TEA 100 | $C_4$ 6.0 | $C'_4$ 6.14 | 0.36 | 9.0 | 50 | 0.917 | 3.3 | 16 | 5.6 |
| A4-8 | " | 65 | 125 | TEA 100 | " | " | 1.8 | 18 | 50 | 0.923 | 2.6 | 9 | 5.5 |
| A4-9 | Solution | 1 | 24.5 | DEAC 2.5 | $C_7$ 0.40 | 4-MP-1 0.040 | 0.25 | 20 | 140 | 0.923 | 2.5 | 8 | 3.3 |
| A4-10 | Slurry | 65 | 121 | TEA 100 | $C_4$ 6.0 | $C'_4$ 3.7 | 1.2 | 20 | 50 | 0.925 | 3.3 | 6 | 5.5 |
| A4-11 | " | 65 | 302 | TEA 100 | " | $C'_4$ 6.14 | 1.4 | 8.5 | 50 | 0.913 | 2.1 | 23 | 5.4 |

Note
TEA = Triethyl aluminum
DEAC = Diethyl aluminum chloride
4-MP-1 = 4-Methylpentene-1
$C_4$ = n-Butane
$C'_4$ = Butene-1
$C'_6$ = Hexene-1
$C_7$ = n-Heptane

TABLE 23

| No. | Polymerization method | Polymerization vessel capacity (l) | Catalyst quantity (mg) | Co-catalyst (mmol) | Solvent (mg) | α-olefin (kg) | $H_2$ partial pressure (kg/cm$^2$) | $C'_2$- partial pressure (kg/cm$^2$) | Polymerization temperature (°C.) | Density (g/cm$^3$) | [η] (dl/g) | S.C.B. | $\overline{M}w/\overline{M}n$ |
|---|---|---|---|---|---|---|---|---|---|---|---|---|---|
| B4-1 | Slurry | 65 | 402 | TEA 50 | $C_4$ 12.0 | $C'_4$ 3.2 | 7.8 | 6 | 70 | 0.929 | 0.85 | 24 | 5.8 |
| B4-2 | Solution | 1 | 24.2 | DEAC 2.5 | $C_7$ 0.80 | 4-MP-1 0.045 | 2.2 | 10 | 140 | 0.929 | 0.81 | 17 | 3.6 |
| B4-3 | Slurry | 65 | 405 | TEA 50 | $C_4$ 12.0 | $C'_4$ 3.2 | 7.0 | 6 | 70 | 0.928 | 0.90 | 24 | 5.7 |
| B4-4 | " | 65 | 425 | TEA 50 | $C_4$ 15.2 | $C'_4$ 2.0 | 10.5 | 5 | 70 | 0.929 | 0.65 | 25 | 5.7 |
| B4-5 | " | 65 | 411 | TEA 50 | " | $C'_4$ 1.6 | 6.5 | 5 | 70 | 0.935 | 0.83 | 20 | 5.5 |
| B4-6 | Solution | 1 | 25.1 | DEAC 2.5 | $C_7$ 0.82 | $C'_6$ 0.017 | 2.7 | 10 | 140 | 0.926 | 0.63 | 18 | 3.5 |
| B4-7 | Slurry | 65 | 346 | TEA 100 | $C_4$ 15.2 | $C'_4$ 1.1 | 12 | 3 | 70 | 0.941 | 0.52 | 16 | 5.4 |
| B4-8 | " | 65 | 408 | TEA 100 | $C_4$ 12.0 | $C'_4$ 4.0 | 5.2 | 4 | 50 | 0.910 | 0.82 | 35 | 5.9 |
| B4-9 | Solution | 1 | 24.9 | DEAC 2.5 | $C_7$ 0.28 | 4-MP-1 0.055 | 2.0 | 10 | 140 | 0.912 | 0.85 | 22 | 3.7 |
| B4-10 | Slurry | 65 | 250 | TEA 100 | $C_4$ 15.2 | $C'_4$ 0.4 | 13.5 | 1.5 | 50 | 0.930 | 0.28 | 25 | 5.7 |
| B4-11 | " | 65 | 410 | TEA 50 | " | $C'_4$ 1.4 | 12 | 3 | 70 | 0.934 | 0.53 | 22 | 5.8 |
| B4-12 | " | 65 | 290 | TEA 50 | $C_4$ 6.0 | $C'_4$ 6.14 | 8.1 | 9 | 50 | 0.927 | 1.2 | 23 | 5.7 |

Note
TEA = Triethyl aluminum
DEAC = Diethyl luminum chloride
4-MP-1 = 4-Methylpenten-1
$C_4$ = n-Butane
$C'_4$ = Butene-1
$C'_6$ = Hexene-1
$C_7$ = n-Heptane

EXAMPLE 35

A composition of ethylene-α-olefin copolymers was prepared in two stage polymerization. The first stage polymerization was carried out for 70 min. using the catalyst produced in Example 1 and triethyl alminum (co-catalyst) and other polymerization conditions as shown in Table 24. Successively, the second stage polymerization was conducted for 180 min. by changing only the hydrogen partial pressure and the ethylene partial pressure as shown in Table 24. In both stages, the liquid phase molar ratio of ethylene, butene-1 and hydrogen was kept at respective fixed levels. The polymerized quantities in each stage were calculated from the quantities of fed ethylene. The copolymers consisted of about 50% by weight of higher molecular weight components and about 50% by weight of lower molecular weight components. Immediately before the completion of the first stage polymerization, a part of the polymer was taken out and measured for its density, intrinsic viscosity, S.C.B. and (weight average molecular weight/number average molecular weight). The whole polymer obtained after the second stage was also measured for the same test items. From the values of the first stage polymer and the whole polymer, the intrinsic viscosity and S.C.B. of the polymer formed in the second stage alone were calculated. These values were shown in Table 24. The whole polymer gave: density 0.921 g/cm$^3$, MI 0.5 g/10 min., MFR 70, intrinsic viscosity 1.7 dl/g, S.C.B. 24. Flow characteristics and solid physical properties of the whole polymer were shown in Table 26.

EXAMPLE 36

By mixing the ethylene-α-olefin copolymer A4-1 obtained in Example 33 and the ethylene-α-olefin copolymer B4-1 obtained in Example 34 at a 50/50 weight ratio and kneading the mixture in a Banbury mixer, a composition of ethylene-α-olefin copolymers having the density, MI and MFR shown in Table 25 was prepared. Physical properties of this composition were also shown in Table 25. For comparison, in Table 25 were also shown Comparative examples 15 and 16 using high pressure polyethylenes of the conventional technique (commercial product Sumikathene ®F 208-1, F 101-1 manufactured by Sumitomo Chemical Co., Ltd.) as well as Comparative example 17 using a low density ethylene-α-olefin copolymer of the conventional technique.

As is obvious from Table 25, the polymer composition of the present invention, when compared with high pressure polyethylenes, has about an equal Brabender torque (satisfactory in processability), and is much superior in tensile impact strength, rigidity, ESCR and tensile strength, and further is about equally satisfactory in transparency.

Compared with the low density ethylene-α-olefin copolymer of the conventional technique, this polymer composition has a much lower Brabender torque (far more excellent in processability) and a higher tensile impact strength and tensile strength.

EXAMPLES 38, 39, 40, 41, 42, 43

By mixing the ethylene-α-olefin copolymers A obtained in Example 33 and the ethylene-α-olefin copolymers B obtained in Example 34 at ratios as shown in Table 26, compositions having densities, MIs and MFRs shown in Table 26 were obtained. Physical properties of these compositions are also shown in Table 26.

In Table 26 are also shown a similar composition prepared by two stage polymerization (Example 35) and, for the purpose of comparison, compositions of low density ethylene-α-olefin copolymers of the conventional technique (Comparative examples 22, 23, 25) of which molecular weight distributions are made wider and of which lower molecular weight components have larger S.C.B. and of which higher molecular weight components have smaller S.C.B. In Table 26 is also shown a composition of ethylene-α-olefin copolymers (Comparative examples 24, to be compared with Examples 40 and 42) of which distribution index of S.C.B. meets the scope of this invention but of which lower molecular weight components have a too low intrinsic viscosity.

As seen in Table 26, in the compositions of this invention, S.C.B. of higher molecular weight components are more than or about equal to those of lower molecular weight components. (Compare Examples 35, 38 and 41 with Comparative examples 22 and 23, and Example 43 with Comparative example 25.) Therefore, compared with the compositions of the conventional technique, the compositions of this invention are far excellent in tensile impact strength and tensile strength, and are superior in transparency.

From the comparison between Comparative example 17 of Table 25 and Comparative example 22 of Table 26, it is learned that widening of molecular weight distribution (higher MFR gives wider distribution) in the manufacture of a low density ethylene-α-olefin copolymer of the conventional technique with its density and MI kept constant results in large reduction in tensile impact strength and tensile strength.

From the comparison of Examples 40 and 42 with Comparative example 24, it is learned that a too low intrinsic viscosity of lower molecular weight components badly affects its tensile impact strength, tensile strength and transparency.

TABLE 24

| No. | Polymerization method | Polymerization vessel capacity (l) | Catalyst quantity (mg) | Co-catalyst TEA (mmol) | Solvent (g) | α-olefin (g) | H$_2$ partial pressure (kg/cm$^2$) | C'$_2$- partial pressure (kg/cm$^2$) | Polymerization temperature (°C.) | Polymerization time (min) | Density (g/cm$^3$) | [η] (dl/g) | S.C.B. | $\overline{M}w/\overline{M}n$ |
|---|---|---|---|---|---|---|---|---|---|---|---|---|---|---|
| 1st stage | Slurry | 5 | 24.3 | 5 | C$_4$ 1000 | C'$_4$ 250 | 0.6 | 4 | 50 | 70 | 0.912 | 2.6 | 24 | 5.7 |
| 2nd stage | Slurry | | | | | | 10 | 5 | | 180 | — | (0.8) | (23) | — |

Note
C$_4$ = n-Butane
C'$_4$ = Butene-1
C'$_2$ = Ethylene
TEA = Triethyl aluminum
( ) = Calculated values

TABLE 25

| | Mixing method | Copolymer A Designation | Copolymer A % by weight | Copolymer B Designation | Copolymer B % by weight | Density (g/cm³) | MI (g/10 min.) | MFR | Distribution index of S.C.B.* |
|---|---|---|---|---|---|---|---|---|---|
| Example 36 | Banbury | A4-1 | 50 | B4-1 | 50 | 0.920 | 0.5 | 70 | 1.0 |
| Example 37 | " | A4-11 | 50 | B4-12 | 50 | 0.921 | 0.7 | 40 | 1.0 |
| Comparative Example 15 | High pressure polyethylene (Sumikathene ® F208-1) | | | | | 0.923 | 1.4 | 50 | — |
| Comparative Example 16 | High pressure polyethylene (Sumikathene ® F101-1) | | | | | 0.922 | 0.3 | 65 | — |
| Comparative Example 17 | Low density ethylene/α-olefin copolymer of the conventionl technique | | | | | 0.920 | 0.5 | 30 | — |

| | Physical properties of composition | | | | | |
|---|---|---|---|---|---|---|
| | Tensile impact strength (kg-cm/cm²) | Olsen's flexural modulus (kg/cm²) | ESCR $F_{50}$ (hr) | Tensile strength (kg/cm²) | Haze (%) | Brabender torque (kg · m) |
| Example 36 | 350 | 2800 | >1000 | 280 | 5 | 2.0 |
| Example 37 | 370 | 3000 | >1000 | 290 | 5 | 2.6 |
| Comparative Example 15 | 130 | 2400 | 0.3 | 160 | 4 | 1.9 |
| Comparative Example 16 | 200 | 2200 | 30 | 180 | 6 | 2.2 |
| Comparative Example 17 | 280 | 3200 | >1000 | 260 | 5 | 3.5 |

*Distribution index of S.C.B. = $\frac{\text{(S.C.B. of copolymer A)}}{\text{(S.C.B of copolymer B)}}$

TABLE 26

| | Mixing method | Copolymer A Designation | Copolymer A % by weight | Copolymer B Designation | Copolymer B % by weight | Density (g/cm³) | MI (g/10 min.) | MFR | Distribution index of S.C.B.* | Tensile impact strength (kg-cm/cm²) | Olsen's flexural modulus (kg/cm²) | Tensile strength (kg/cm²) | Haze (%) | Tackiness |
|---|---|---|---|---|---|---|---|---|---|---|---|---|---|---|
| Example 35 | Two stage polymerization | | | | | 0.921 | 0.5 | 70 | (1.0) | 340 | 2800 | 280 | 6 | o |
| Example 38 | Solution | A4-2 | 50 | B4-2 | 50 | 0.920 | 0.6 | 70 | 1.0 | 430 | 2800 | 320 | 5 | o |
| Example 39 | " | A4-3 | 30 | B4-3 | 70 | 0.921 | 0.3 | 90 | 0.8 | 370 | 2800 | 300 | 7 | o |
| Example 40 | Banbury | A4-4 | 50 | B4-4 | 50 | 0.920 | 1.1 | 65 | 1.0 | 290 | 2800 | 250 | 6 | o |
| Example 41 | " | A4-5 | 50 | B4-5 | 50 | 0.920 | 0.5 | 70 | 1.5 | 400 | 2700 | 300 | 8 | o |
| Example 42 | Solution | A4-6 | 50 | B4-6 | 50 | 0.920 | 1.1 | 65 | 1.0 | 360 | 2800 | 310 | 5 | o |
| Example 43 | Banbury | A4-7 | 50 | B4-7 | 50 | 0.929 | 0.2 | 10 | 1.0 | 370 | 4200 | 300 | 8 | o |
| Comparative Example 22 | " | A4-8 | 50 | B4-8 | 50 | 0.920 | 0.5 | 70 | 0.26 | 150 | 3300 | 210 | 12 | X |
| Comparative Example 23 | Solution | A4-9 | 50 | B4-9 | 50 | 0.920 | 0.6 | 65 | 0.36 | 180 | 3200 | 220 | 12 | Δ |
| Comparative Example 24 | Banbury | A4-4 | 65 | B4-10 | 35 | 0.920 | 0.8 | 50 | 1.0 | 130 | 2800 | 220 | 15 | o |
| Comparative Example 25 | " | A4-10 | 50 | B4-11 | 50 | 0.930 | 0.2 | 100 | 0.27 | 170 | 4800 | 230 | 20 | o |

*Distribution index of S.C.B. = (S.C.B. of copolymer A)/(S.C.B. of copolymer B)

EXAMPLE 44

The compositions prepared in Examples 36 and 37 as well as the low density ethylene-α-olefin copolymer of the conventional technique used in Comparative example 17 were subjected to film processing in the same conditions as used in Example 32.

The commercial high pressure polyethylenes used in Comparative examples 15 and 16 were also subjected to film processing in the same conditions. A satisfactory film was not obtained from the low density ethylene-α-olefin copolymer of the conventional technique used in Comparative example 17, with too much load put on the motor and with shark skin formed on the film surface.

Satisfactory films having good transparency were obtained from the compositions prepared in Examples 36 and 37 and the commercial high pressure polyethylenes used in Comparative examples 15 and 16, with no problem of motor load. Physical properties of these films are shown in Table 27. Compared with the films of the high pressure method polyethylenes, the films of the compositions prepared in Examples 36 and 37 had about same transparency but were superior in dart impact strength, Elmendorf tear strength (absolute value property and MD/TD balance), heat-sealing properties, tensile strength, hot tack and heat sealing strength in contaminated condition. In case of the films of the com-

COMPARATIVE EXAMPLE 24

By mixing an ethylene-α-olefin copolymer A obtained in Example 33 and an ethylene-α-olefin copolymer B obtained in Example 34 at a ratio shown in Table 26, a composition of ethylene-α-olefin copolymers was prepared of which distribution index of S.C.B. meets the scope of this invention but of which lower molecular weight components have a too low intrinsic viscosity. Its density, MI, MFR and physical properties are shown in Table 26.

TABLE 27

|  | Haze (%) | Dart impact strength (kg · cm/mm) | Elmendorf tear strength MD/TD (kg/cm) | Tensile strength MD/TD (kg/cm$^2$) | Heat-sealing strength (kg/15 mm width) | Hot tack property (mm) | Heat sealing strength in contaminated condition |
|---|---|---|---|---|---|---|---|
| Example 36 | 5 | 500 | 90/120 | 410/380 | 1.2 | 2.0 | o |
| Example 37 | 5 | 450 | 60/120 | 420/370 | 1.3 | 2.0 | o |
| Comparative Example 15 | 4 | 270 | 80/50 | 250/210 | 0.7 | 4.0 | Δ |
| Comparative Example 16 | 7 | 250 | 70/70 | 280/250 | 0.7 | 3.0 | Δ | positions prepared in Examples 36 and 37, heat-sealing strengths and heat sealing strength in contaminated condition were at about same levels, but in the films of the high pressure polyethylenes of Comparative example 16, heat sealing strength in contaminated condition were lower than heat-sealing strengths.

COMPARATIVE EXAMPLES 22, 23, 25

By mixing ethylene-α-olefin copolymers A obtained in Example 33 and ethylene-α-olefin copolymers B obtained in Example 34 at ratios as shown in Table 26, compositions of low density ethylene-α-olefin copolymers of the conventional technique were prepared of which molecular weight distribution are made wider and of which lower molecular weight components have larger S.C.B. and of which higher molecular weight components have smaller S.C.B. Densities, MIs, MFRs and physical properties of these compositions are shown in Table 26.

EXAMPLE 45

Ethylene-α-olefin copolymers were synthesized using the catalyst produced in Example 1 and organoaluminum compounds (co-catalyst) and employing α-olefins and other polymerization conditions as shown in Table 28. Densities, intrinsic viscosities, and S.C.B. of these copolymers are shown in Table 28.

These copolymers are used in the following examples as higher molecular weight components.

EXAMPLE 46

Ethylene-α-olefin copolymers were synthesized using the catalyst produced in Example 1 and organoaluminum compounds (co-catalyst) and employing α-olefins and other polymerization conditions as shown in Table 29. Densities, intrinsic viscosities and S.C.B. of these copolymers are shown in Table 29.

These copolymers are used in the following examples as lower molecular weight components.

TABLE 28

| No. | Polymerization method | Polymerization vessel capacity (l) | Catalyst quantity (mg) | Co-catalyst (mmol) | Solvent (kg) | α-olefin (kg) | H$_2$ partial pressure (kg) | C'$_2$-partial pressure (kg/cm$^2$) | Polymerization temperature (°C.) | Properties Density (g/cm$^3$) | [η] (dl/g) | S.C.B. |
|---|---|---|---|---|---|---|---|---|---|---|---|---|
| A-1 | Slurry | 65 | 131 | TEA 100 | C$_4$ 6.0 | C'$_4$ 6.14 | 0.45 | 5.0 | 50 | 0.899 | 2.6 | 38 |
| A-2 | " | 65 | 145 | TEA 50 | " | " | 0.59 | 6.7 | 50 | 0.906 | 2.6 | 29 |
| A-3 | " | 65 | 310 | TEA 100 | " | " | 0.70 | 7.8 | 50 | 0.912 | 2.6 | 24 |
| A-4 | " | 65 | 125 | " | " | " | 1.8 | 18 | 50 | 0.923 | 2.6 | 9 |
| A-5 | Solution | 1 | 25.3 | DEAC 2.5 | C$_7$ 0.25 | 4-MP-1 0.11 | 0.1 | 20 | 140 | 0.904 | 2.5 | 23 |
| A-6 | Solution | 1 | 24.5 | " | C$_7$ 0.30 | 4-MP-1 0.05 | 0.15 | 20 | 140 | 0.920 | 2.5 | 10 |
| A-7 | Slurry | 65 | 121 | TEA 50 | C$_4$ 6.0 | C'$_4$ 6.14 | 0.98 | 6.5 | 50 | 0.907 | 2.2 | 30 |
| A-8 | " | 65 | 320 | TEA 100 | " | " | 3.0 | 20 | 50 | 0.928 | 2.2 | 8 |

Note
TEA = Triethyl aluminum
DEAC = Diethyl aluminum chloride
4-MP-1 = 4-Methylpentene-1
C$_4$ = n-Butane
C'$_4$ = Butene-1
C$_7$ = n-Heptane

TABLE 29

| No. | Polymerization method | Polymerization vessel capacity (l) | Catalyst quantity (mg) | Co-catalyst (mmol) | Solvent (kg) | α-olefin (kg) | $H_2$ partial pressure (kg/cm²) | $C'_2$- partial pressure (kg/cm²) | Polymerization temperature (°C) | Density (g/cm³) | [η] (dl/g) | S.C.B. |
|---|---|---|---|---|---|---|---|---|---|---|---|---|
| B-1 | Slurry | 65 | 405 | TEA 50 | $C_4$ 50 | $C'_4$ 2.0 | 10.8 | 8.3 | 70 | 0.912 | 0.83 | 15 |
| B-2 | " | 65 | 411 | " | $C_4$ 15.2 | $C'_4$ 1.6 | 6.5 | 5 | 70 | 0.935 | 0.83 | 20 |
| B-3 | " | 65 | 402 | " | $C_4$ 12.0 | $C'_4$ 3.2 | 7.8 | 6 | 70 | 0.929 | 0.85 | 24 |
| B-4 | " | 65 | 408 | TEA 100 | " | $C'_4$ 4.0 | 5.2 | 4 | 50 | 0.910 | 0.82 | 35 |
| B-5 | Solution | 1 | 26.5 | DEAC 2.5 | $C_7$ 0.28 | 4-MP-1 0.03 | 3.0 | 10 | 140 | 0.938 | 0.50 | 13 |
| B-6 | " | 1 | 25.7 | " | $C_7$ 0.25 | 4-MP-1 0.05 | 2.5 | 10 | 140 | 0.912 | 0.52 | 22 |
| B-7 | Slurry | 65 | 407 | TEA 100 | $C_4$ 15.4 | $C'_4$ 0.5 | 13.0 | 5 | 70 | 0.953 | 0.62 | 9 |
| B-8 | " | 65 | 422 | TEA 50 | $C_4$ 15.2 | $C'_4$ 1.8 | 11.0 | 5 | 70 | 0.934 | 0.61 | 22 |

Note
TEA = Triethyl aluminum
DEAC = Diethyl aluminum chloride
4-MP-1 = 4-Methylpentene-1
$C_4$ = n-Butane
$C'_4$ = Butene-1
$C_7$ = n-Heptane

EXAMPLE 47

Figure 4:
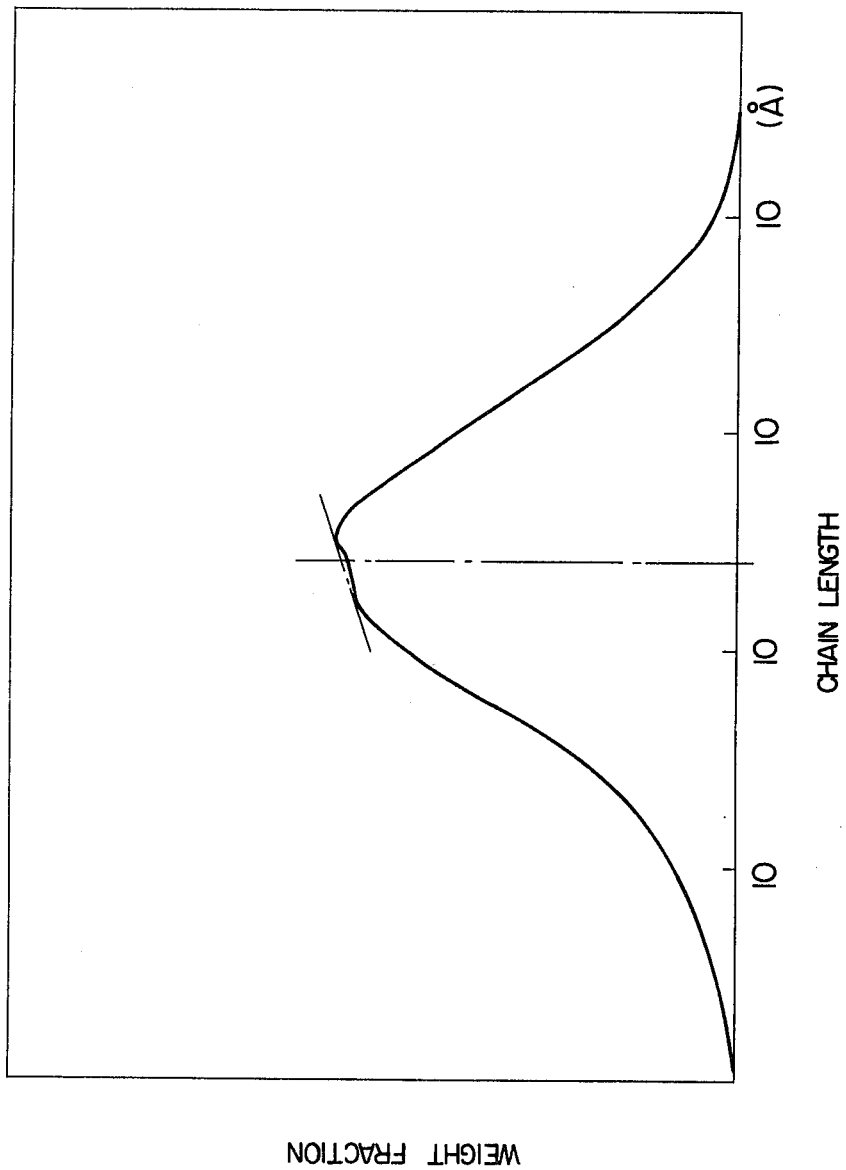

A composition of ethylene-α-olefin copolymers was prepared in two stage polymerization. The first stage polymerization was carried out for 70 min. using the catalyst produced in Example 1 and triethyl aluminum (co-catalyst) and other polymerization conditions as shown in Table 30. Successively, the second stage polymerization was conducted for 180 min. by changing only the hydrogen partial pressure and the ethylene partial pressure as shown in Table 30. In both stages, the liquid phase molar ratio of ethylene, butene-1 and hydrogen was kept constant at respective fixed levels. The polymerized quantities in each stage were calculated from the quantities of fed ethylene. The copolymer composition consisted of about 50% by weight of higher molecular weight components and about 50% by weight of lower molecular weight components. Immediately before the completion of the first stage polymerization, a part of the polymer was taken out and measured for its density, intrinsic viscosity and S.C.B. The whole polymer obtained after the second stage was also measured for the same test items. From the values of the first stage polymer and the whole polymer, the intrinsic viscosity and the number of branched short chains of the polymer formed in the second stage alone were calculated. These values were shown in Table 30. The whole polymer gave: density 0.921 g/cm³, MI 0.5 g/10 min., MFR 70, intrinsic viscosity 1.7 dl/g, S.C.B. 24, $g_\eta^*$ 0.93. The whole polymer was subjected to gel permeation chromatography and a curve of molecular weight distribution shown in FIG. 4 was obtained.

Because of bimodal distribution which has two peaks, the curve was divided into two parts using broken lines. The areas of each part were calculated, and the lower molecular weight components and the higher molecular weight components were determined to be 48 and 52% by weight, respectively.

The whole polymer was divided into 30 fractions using column chromatography. These fractions were divided into two parts (the lower molecular weight components and the higher molecular weight components) so that the former became 48% by weight and the latter 52% by weight. S.C.B., densities and intrinsic viscosities of each component are shown in Table 32.

Flow characteristics and solid physical properties of the whole polymer are shown in Table 33.

In the following examples, ethylene-α-olefin copolymers as higher molecular weight components and ethylene-α-olefin copolymers as lower molecular weight components were mixed at respective fixed ratios (total quantity 1 kg) and kneaded for 5 min. with a Banbury mixer (150 to 230 rpm). At that time, replacement by nitrogen was conducted completely and the polymer temperatures were controlled not to exceed 250° C.

When sample quantities were small, mixing was made in xylene. After mixing, the whole solution was added into methanol to cause precipitation. After filtration, the precipitate was completely dried in a vacuum drier and used as a copolymers composition sample.

EXAMPLES 48, 49, 50

Ethylene-α-olefin copolymers obtained in Example 45 and ethylene-α-olefin copolymers obtained in Example 46 were kneaded with a Banbury mixer at ratios as shown in Table 31.

Thus, compositions of copolymers having densities, MIs, MFRs, intrinsic viscosities, S.C.B. and $g_\eta^*$ shown in Table 32 were obtained. These compositions had molecular weight distribution curves about equal to FIG. 4. With the ssame technique as used in Example 47, quantities of lower molecular weight components and higher molecular weight components were calculated, and they were both approximately 50% by weight as shown in Table 32. Physical properties of these compositions are shown in Table 33.

With the same technique as used in Example 47, column fractionation was applied in order to divide into higher molecular weight components and lower molecular weight components. Characteristics of the components are shown in Table 32.

In Tables 32 and 33 are also shown Example 47 using a composition of ethylene-α-olefin copolymers prepared in two stage polymerization and, for comparison, Comparative example 26 using a high pressure method polyethylene of the conventional technique (commercial product Sumikathene ®F 101-1 manufactured by Sumitomo Chemical Co., Ltd.), Comparative example 27 using a composition of low density ethylene-α-olefin copolymers of the conventional technique and Comparative example 28 using a composition of low density ethylene-α-olefin copolymers of the conventional technique of which moelcular weight distribution is made wider and of which lower molecular weight components have larger S.C.B. and of which higher molecular weight components have smaller S.C.B.

As is obvious from Tables 32 and 33, when compared with the high pressure polyethylene, the copolymer compositions of this invention have about equivalent Brabender torques (excellent in processability), and are largely excellent in tensile impact strength, rigidity, ESCR and tensile strength. Transparency is equally good, because distribution index of S.C.B. is in a certain range as defined by the present invention. When compared with the composition of low density ethylene-α-olefin copolymers of the conventional technique, the compositions of this invention have far smaller Brabender torques (much better processability) and higher tensile impact strengths and tensile strengths.

From comparison between Comparative examples 27 and 28 in Tables 32 and 33, it is learned that widening of molecular weight distribution (larger MFR gives wider distribution) in the manufacture of a low density ethylene-α-olefin copolymer of the conventional technique with density and MI fixed results in large reduction in tensile impact strength and tensile strength.

TABLE 30

| No. | Polymerization method | Polymerization vessel capacity (l) | Catalyst quantity (mg) | Co-catalyst TEA (mmol) | Solvent (g) | α-olefin (g) | $H_2$ partial pressure (kg/cm$^2$) | $C'_2$- partial pressure (kg/cm$^2$) | Polymerization temperature (°C.) | Polymerization time (min) | Density (g/cm$^3$) | [η] (dl/g) | S.C.B. |
|---|---|---|---|---|---|---|---|---|---|---|---|---|---|
| 1st stage | Slurry | 5 | 24.3 | 5 | C$_4$ 1000 | C'$_4$ 250 | 0.6 | 4 | 50 | 70 | 0.912 | 2.6 | 24 |
| 2nd stage | Slurry | | | | | | 10 | 5 | | 180 | — | (0.8) | (23) |

Note
C$_4$ = n-Butane
C'$_4$ = Butene-1
C'$_2$ = Ethylene
TEA = Triethyl aluminum
( ) = Calculated values

TABLE 31

| | Higher molecular weight component | | Lower molecular weight component | |
|---|---|---|---|---|
| | Designation | % by weight | Designation | % by weight |
| Example 48 | A-1 | 50 | B-1 | 50 |
| Example 49 | A-2 | 50 | B-2 | 50 |
| Example 50 | A-3 | 50 | B-3 | 50 |
| Comparative Example 28 | A-4 | 50 | B-4 | 50 |

TABLE 32

| | Properties of copolymer | | | | | | GPC | | | |
| | | | | | | | Length of main peak chain (A) | | Ratio (% by weight) | |
| | Density (g/cm$^3$) | MI (g/10 min.) | MFR | [η] (dl/g) | S.C.B. | $g_\eta$* | Lower molecular weight component | Higher molecular weight component | Lower molecular weight component | Higher molecular weight component |
|---|---|---|---|---|---|---|---|---|---|---|
| Example 47 | 0.921 | 0.5 | 70 | 1.7 | 24 | 0.96 | 1.7 × 10$^3$ | 3.4 × 10$^3$ | 48 | 52 |
| Example 48 | 0.920 | 0.5 | 70 | 1.7 | 26 | 0.97 | 1.7 × 10$^3$ | 3.4 × 10$^3$ | 48 | 52 |
| Example 49 | 0.920 | 0.5 | 70 | 1.7 | 25 | 0.93 | 1.6 × 10$^3$ | 3.5 × 10$^3$ | 47 | 53 |
| Example 50 | 0.920 | 0.5 | 70 | 1.7 | 24 | 0.97 | 1.9 × 10$^3$ | 3.4 × 10$^3$ | 48 | 52 |
| Comparative Example 26 | 0.922 | 0.3 | 65 | 1.06 | 23 | 0.48 | 1.05 × 10$^3$ | 6.5 × 10$^3$ | 36 | 64 |
| Comparative Example 27 | 0.920 | 0.5 | 30 | 1.7 | 23 | 0.95 | Uniform distribution (peak) 2.8 × 10$^3$ | | 50 | 50 |
| Comparative Example 28 | 0.920 | 0.5 | 70 | 1.7 | 22 | 0.95 | 1.6 × 10$^3$ | 3.6 × 10$^3$ | 49 | 51 |

| | Characteristics of components fractionated by column fractionation | | | | | | |
| | Lower molecular weight component | | | Higher molecular weight component | | | Distribution index of S.C.B.* |
| | S.C.B. | Density (g/cm$^3$) | [η] (dl/g) | S.C.B. | Density (g/cm$^3$) | [η] (dl/g) | |
|---|---|---|---|---|---|---|---|
| Example 47 | 30 | 0.920 | 0.8 | 18 | 0.915 | 2.6 | 0.6 |
| Example 48 | 27 | 0.924 | 0.8 | 25 | 0.910 | 2.6 | 0.9 |
| Example 49 | 28 | 0.923 | 0.7 | 20 | 0.914 | 2.5 | 0.7 |
| Example 50 | 30 | 0.920 | 0.8 | 18 | 0.915 | 2.5 | 0.6 |
| Comparative Example 26 | 27 | 0.916 | 0.6 | 19 | 0.926 | 1.4 | 0.7 |
| Comparative Example 27 | 38 | 0.906 | 1.1 | 8 | 0.925 | 2.4 | 0.2 |
| Comparative Example 28 | 37 | 0.907 | 0.8 | 7 | 0.926 | 2.6 | 0.2 |

*Distribution index of S.C.B. = $\dfrac{\text{Degree of S.C.B. of higher molecular weight component}}{\text{Degree of S.C.B. of lower molecular weight component}}$

TABLE 33

| | Physical properties of copolymer | | | | | | |
|---|---|---|---|---|---|---|---|
| | Tensile impact strength (kg-cm/cm$^2$) | Olsen's Flexural modulus (kg/cm$^2$) | Tensile strength (kg/cm$^2$) | Haze (%) | Torque (kg-m) | ESCR F$_{50}$ (hr) | Tackiness |
| Example 47 | 340 | 2800 | 280 | 5 | 2.0 | >1000 | o |
| Example 48 | 450 | 2600 | 320 | 20 | 2.0 | >1000 | o |
| Example 49 | 400 | 2700 | 300 | 8 | 2.0 | >1000 | o |
| Example 50 | 350 | 2800 | 280 | 5 | 2.0 | >1000 | o |
| Comparative Example 26 | 200 | 2200 | 180 | 6 | 2.2 | 30 | o |
| Comparative Example 27 | 280 | 3200 | 260 | 8 | 3.5 | >1000 | o |
| Comparative Example 28 | 150 | 3300 | 210 | 12 | 2.0 | >1000 | x |

EXAMPLES 51, 52

Compositions of ethylene-α-olefin copolymers were prepared by mixing ethylene-α-olefin copolymers obtained in Example 45 and ethylene-α-olefin copolymers obtained in Example 46 at ratios shown in Table 34. Densities, MIs, MFRs, [η], S.C.B. and g$_η$* of these compositions are shown in Table 35. Their physical properties are shown in Table 36.

Figure 5:
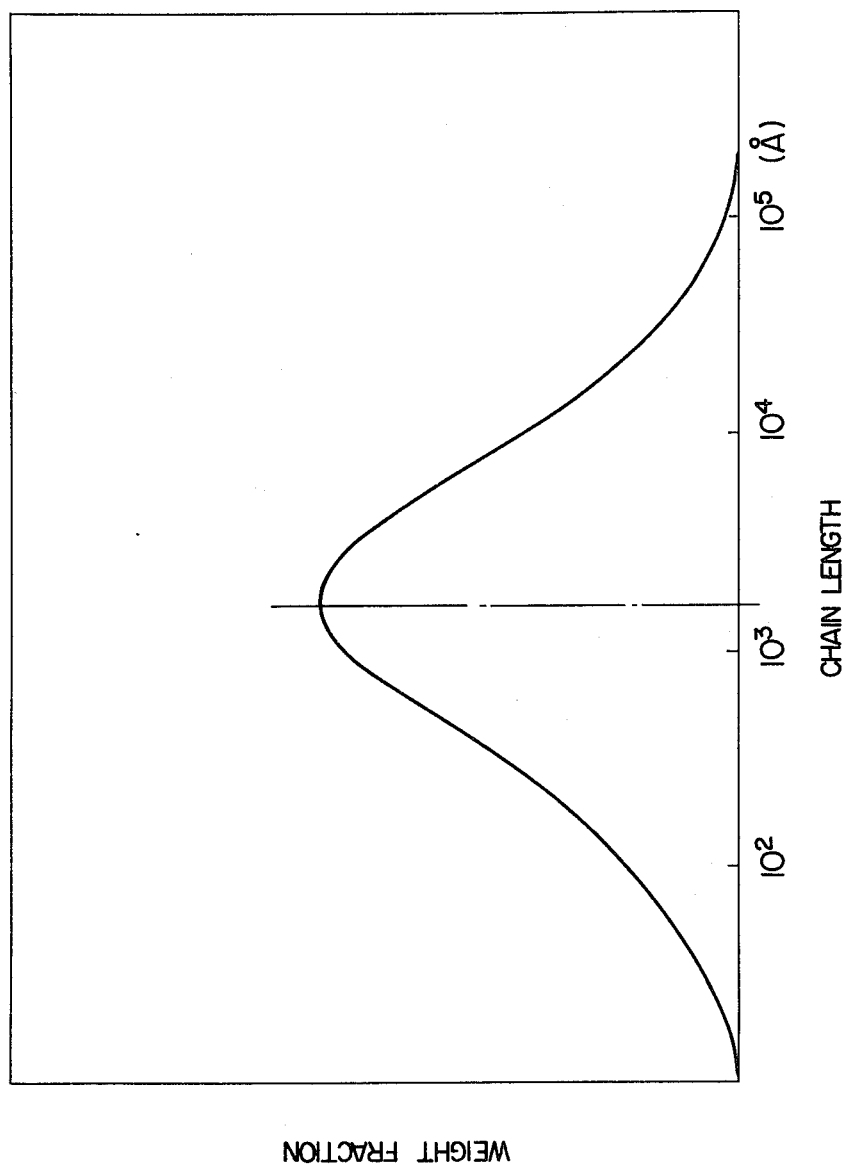

Molecular weight distributions of Examples 51 and 52 showed "one almost symmetrical mountain" curves. The curve in FIG. 5 is that of Example 52. Column fractionation was applied with the same technique as used in Example 47. Its results are shown in Table 35.

In Tables 35 and 36 are also shown low density ethylene-α-olefin copolymers of the conventional technique (Comparative examples 29 and 30) of which molecular weight distributions are made wider and of which lower molecular weight components have larger S.C.B. and of which higher molecular weight components have smaller S.C.B.

Curves of molecular weight distributions of Comparative examples 29 and 30 were similar to those of Examples 51 and 52. As seen from Tables 35 and 36, in the compositions of this invention, S.C.B. of higher molecular weight components and those of lower molecular weight components are nearly equal (compare Example 51 with Comparative example 29, and also Example 52 with Comparative example 30), therefore, the compositions of the present invention are far superior to the copolymers of the conventional technique in tensile impact strength and tensile strength.

COMPARATIVE EXAMPLE 26

A commercial high pressure polyethylene (Sumikathene ®F 101-1 manufactured by Sumitomo Chemical Co., Ltd.) was subjected to measurements of physical properties and. Results are shown in Table 33.

Figure 6:
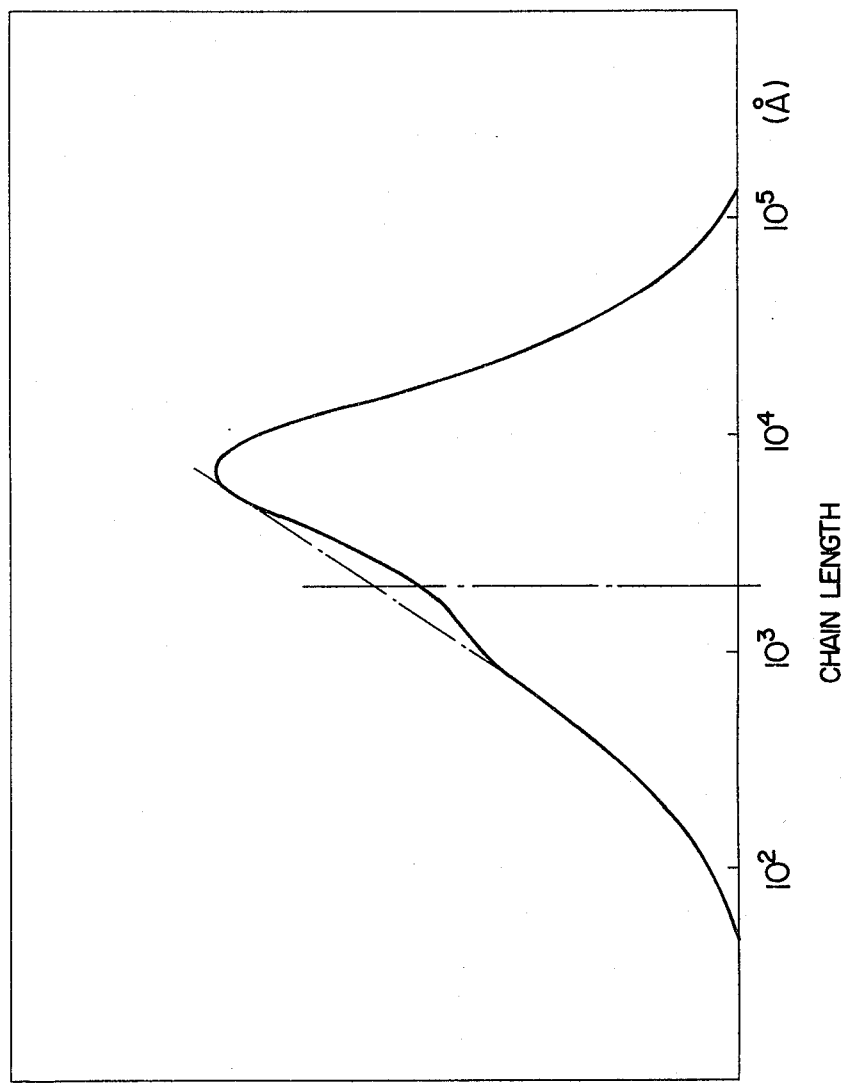

This polyethylene has low g$_η$* of 0.48 and it suggests that this sample has many long chain branches. Its molecular weight distribution curve was shown in FIG. 6. Column fractionation was applied with the same technique as used in Example 47. The fractions obtained were divided into two groups so that the lower molecular weight component group and the higher molecular weight component group became about 36 and 64% by weight, respectively. Densities, S.C.B. and intrinsic viscosity of each group are measured and results were shown in Table 32.

COMPARATIVE EXAMPLE 27

A low density ethylene-α-olefin copolymer of the conventional technique was synthesized using the catalyst produced in Example 1, triethyl aluminum (cocatalyst) and other polymerization conditions as shown in Table 37. The copolymer gave: density 0.920 g/cm$^3$, MI 0.5 g/10 min., MFR 30, intrinsic viscosity 1.7 dl/g, S.C.B. 23, g$_η$* 0.95. Its physical properties are shown in Table 33. Its molecular weight distribution showed "one almost symmetrical mountain" curve, as seen in FIG. 1. From the area ratio, the lower molecular weight components and the higher molecular weight components were determined to be both 50% by weight. Column fractionation was applied with the same technique as used in Example 47 and results are shown in Table 32.

COMPARATIVE EXAMPLE 28

By mixing the ethylene-α-olefin copolymer A-4 obtained in Example 45 and the ethylene-α-olefin copolymer B-4 obtained in Example 46 at the ratio as given in Table 31, a composition of low density ethylene-α-olefin copolymers of the conventional technique was prepared of which molecular weight distribution is made wider and of which lower molecular weight components have larger S.C.B. and of which higher molecular weight components have smaller S.C.B. Its density, MI, MFR, [η], and g$_η$* are shown in Table 32. The molecular weight distribution curve of this composition was almost equal to that in FIG. 4. With the same technique as used in Example 47, the ratio of the lower and higher molecular weight components was determined. Column fractionation was also conducted. These results are shown in Table 32. Physical proeprties of this composition are shown in Table 33.

COMPARATIVE EXAMPLES 29, 30

By mixing ethylene-α-olefin copolymers obtained in Example 45 and ethylene-α-olefin copolymers obtained in Example 46 at ratios as shown in Table 34, compositions of low density ethylene-α-olefin copolymers of the conventional technique were prepared of which molecular weigh weight distributions are made wider and of which lower molecular weight components have larger S.C.B. and of which higher molecular weight components have smaller S.C.B. Densities, MIs, MFRs, [η], S.C.B. and g$_η$* of these compositions were shown in Table 35. Physical properties of these compositions were shown in Table 36.

TABLE 34

| | Higher molecular weight component | | Lower molecular weight component | |
|---|---|---|---|---|
| | Designation | % by weight | Designation | % by weight |
| Example 51 | A-5 | 60 | B-5 | 40 |
| Example 52 | A-7 | 50 | B-7 | 50 |
| Comparative Example 29 | A-6 | 60 | B-6 | 40 |
| Comparative Example 30 | A-8 | 50 | B-8 | 50 |

TABLE 35

| | Properties of copolymer | | | | | | GPC | | | |
|---|---|---|---|---|---|---|---|---|---|---|
| | | | | | | | Length of main peak chain (Å) | | Ratio (% by weight) | |
| | Density (g/cm³) | MI (g/10 min) | MFR | [η] (dl/g) | S.C.B. | $g_\eta$* | Lower molecular weight component | Higher molecular weight component | Lower molecular weight component | Higher molecular weight component |
| Example 51 | 0.920 | 0.5 | 70 | 1.7 | 19 | 0.91 | Uniform distribution (peak) 2.5 × 10³ | | 57 | 43 |
| Example 52 | 0.929 | 1.2 | 70 | 1.4 | 20 | 0.95 | Uniform distribution (peak) 1.6 × 10³ | | 48 | 52 |
| Comparative Example 29 | 0.919 | 0.5 | 70 | 1.7 | 17 | 0.96 | Uniform distribution (peak) 2.5 × 10³ | | 58 | 42 |
| Comparative Example 30 | 0.929 | 1.2 | 70 | 1.4 | 17 | 0.93 | Uniform distribution (peak) 1.6 × 10³ | | 48 | 52 |

| | Characteristics of components fractionated by column fractionation | | | | | | |
|---|---|---|---|---|---|---|---|
| | Lower molecular weight component | | | Higher molecular weight component | | | Distribution index of S.C.B.* |
| | S.C.B. | Density (g/cm³) | [η] (dl/g) | S.C.B. | Density (g/cm³) | [η] (dl/g) | |
| Example 51 | 22 | 0.933 | 0.5 | 15 | 0.920 | 2.4 | 0.7 |
| Example 52 | 20 | 0.935 | 0.6 | 20 | 0.915 | 2.2 | 1.0 |
| Comparative Example 29 | 24 | 0.930 | 0.5 | 7 | 0.927 | 2.4 | 0.3 |
| Comparative Example 30 | 29 | 0.922 | 0.6 | 6 | 0.930 | 2.1 | 0.2 |

*Distribution index of S.C.B. = $\dfrac{\text{Degree of S.C.B. of higher molecular weight component}}{\text{Degree of S.C.B. of lower molecular weight component}}$

TABLE 36

| | Physical properties of copolymer | | | |
|---|---|---|---|---|
| | Tensile impact strength (kg·cm/cm²) | Olsen's Flexural modulus (kg/cm²) | Tensile strength (kg/cm²) | Tackiness |
| Example 51 | 480 | 2600 | 320 | o |
| Example 52 | 250 | 3700 | 250 | o |
| Comparative Example 29 | 200 | 3100 | 200 | x |
| Comparative Example 30 | 70 | 4500 | 200 | o |

TABLE 37

| Polymerization method | Polymerization vessel capacity (l) | Catalyst quantity (mg) | Co-catalyst TEA (mmol) | Solvent (kg) | α-olefin (kg) | H₂ partial pressure (kg/cm²) | C'₂ partial pressure (kg/cm²) | Polymerization temperature (°C.) | Polymerization time (min) |
|---|---|---|---|---|---|---|---|---|---|
| Slurry | 65 | 202 | 100 | C₄ 7.0 | C'₄ 7.16 | 3.0 | 10 | 50 | 90 |

Note
TEA = Triethyl aluminum
C₄ = n-Butane
C'₂ = Ethylene
C'₄ = Butene-1

REFERENCE EXAMPLE 1

Figure 7:
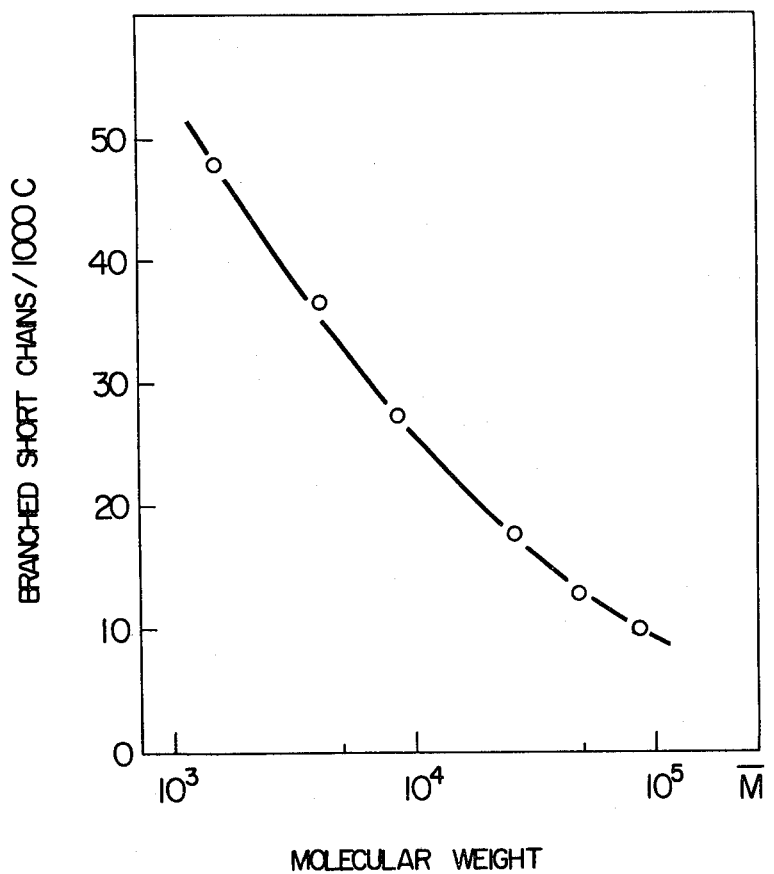
FIG. 7 is a typical example showing "distribution of S.C.B against molecular weight" of an ethylene-α-olefin copolymer of the conventional technique.

An ethylene-α-olefin copolymer was synthesized from ethylene and butene-1, using the catalyst produced in Example 1, diethyl alminum monochloride (co-catalyst) and other polymerization conditions as shown in Table 38. Properties of this copolymer are shown in Table 39. By applying column fractionation, the copolymer was fractionated into fractions of different molecular weights. Then, distribution of S.C.B. against molecular weight was examined as shown in FIG. 7.

In column fractionation, about 5 g of the sample was placed in a fractionation column after being adsorbed on a carrier (Celite 745) in xylene. Then, the column was heated to 130° C., and butyl cellosolve and xylene were passed through the column with the mixing ratio being gradually changed in order to obtain a gradual increase in solvency. Thus, all the copolymer fractions of lower to higher molecular weight were separated. To the eluates was added methanol to cause precipitation of the copolymers. After recovery, the polymers were dried under reduced pressure and each copolymer fraction was obtained. In the above column fractionation process, in order to prevent the possible decomposition of the copolymers, 100 ppm of Irganox® 1076 was added to the original sample and further air inside the column was replaced by nitrogen. Using each copolymer fraction, pressed sheets having about 100 to 300μ thickness were prepared, and S.C.B. of each copolymer fraction were calculated by conducting Fourier-transform infrared absorption spectroscopy. Molecular weights of each copolymer fraction were calculated, using intrinsic viscosities [η] measured in tetralin of 135° C. and the following formula.

$$[\eta] = 5.1 \times 10^{-4} \cdot M_n^{0.725}$$

REFERENCE EXAMPLE 2

Figure 8:
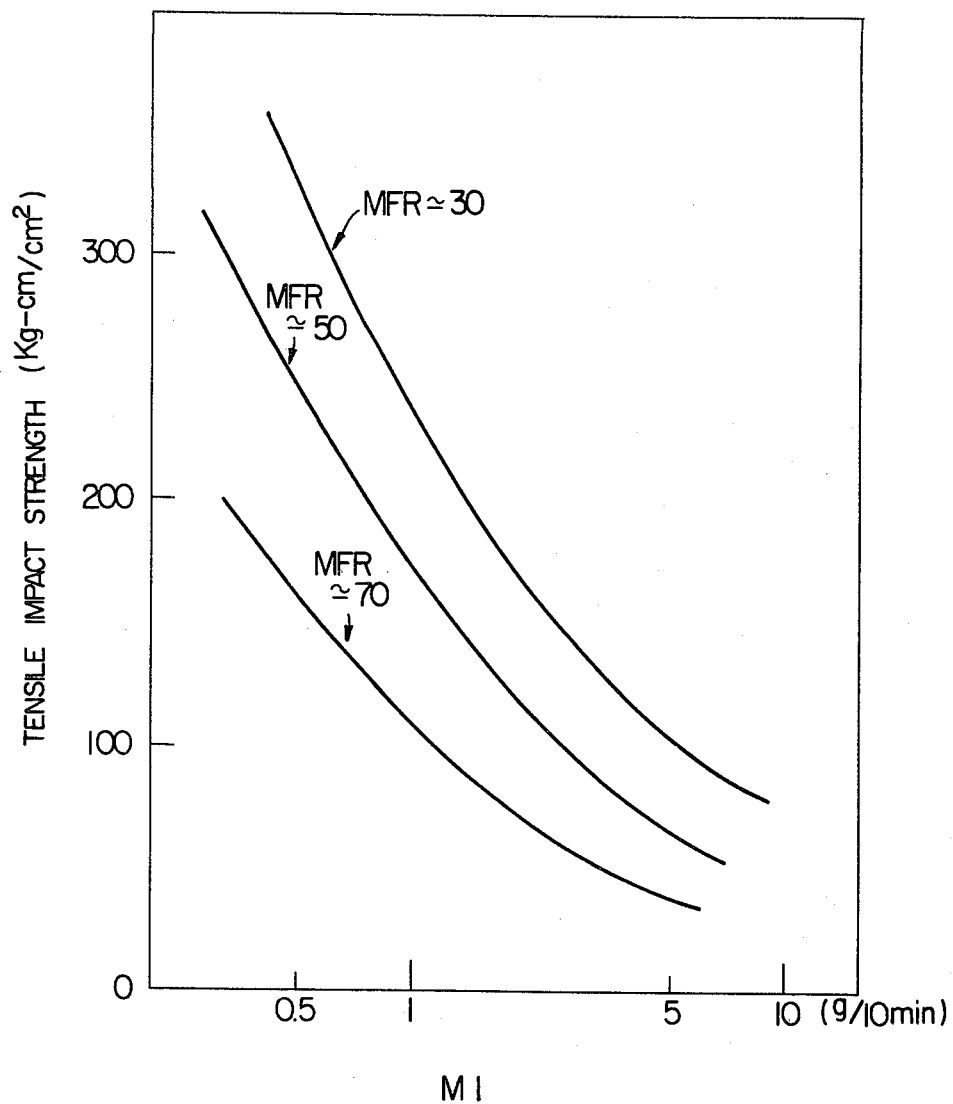
FIG. 8 shows correlations between melt indices (MI) and tensile impact strengths of ethylene-α-olefin copolymers of the conventional technique, with their melt flow ratios (MRF) used as a parameter.

With ethylene-α-olefin copolymers of the conventional technique, a relationship between melt index (MI) and tensile impact strength was examined with melt flow ratio (MFR) used as a parameter. Results were shown in FIG. 8. It is revealed that widening of molecular weight distribution results in remarkable reduction in tensile impact strength. (In the figure, molecular weight distribution was represented by MFR. Larger MFR means wider molecular weight distribution.). These ethylene-α-olefin copolymers were subjected to molecular weight fractionation with the same technique as used in Reference Example 1. All the copolymers showed trends similar to that of Reference Example 1. The fractions were divided into two groups (lower molecular weight group and higher molecular weight group) in such a way that each group became about 50% by weight, and (S.C.B. of higher molecular weight component/S.C.B. of lower molecular weight component) was calculated. It was below 0.5 in all the copolymers.

REFERENCE EXAMPLE 3

Figure 9:
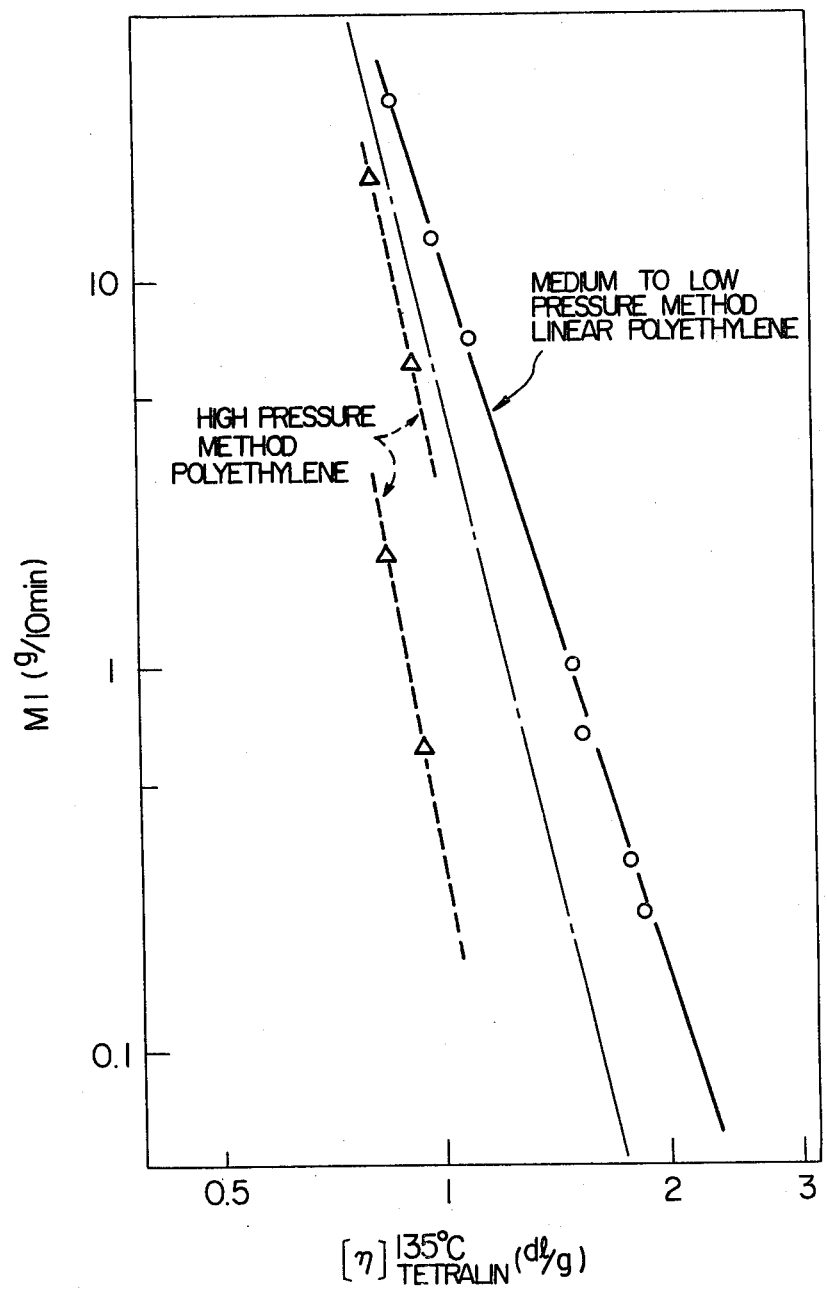
FIG. 9 shows correlations between MI and intrinsic viscosities [η] of a high pressure polyethylene and a linear polyethylene of the medium to low pressure method as a method for distinguishing these two polymers. In the figure, a broken line is drawn to separate two territories, the left side territory is for the high pressure polyethylene of the conventional technique and the right side territory is for the linear polyethylene of the medium to low pressure method.

With a high pressure method polyethylene of the conventional technique and a linear, high density polyethylene of medium to low pressure method, correlations between melt index (MI) and intrinsic viscosity [η] were examined and are shown in FIG. 9. The correlation lines of each sample are clearly divided by a partition line (broken line). It is learned that the high pressure polyethylene has much lower intrinsic viscosity than that of the linear high density polyethylene of the same melt index.

A correlation between melt index and intrinsic viscosity was examined with the ethylene-α-olefin copolymers of the present invention. All of the copolymers of the present invention fell in the zone of the linear, high density polyethylene.

TABLE 38

| Polymerization method | Polymerization vessel capacity (l) | Catalyst quantity (mg) | Solvent (g) | α-olefin (g) | $H_2$ partial pressure (kg/cm²) | $C'_2$ partial pressure (kg/cm²) | Polymerization temperature (°C.) | Polymerization time (min) |
|---|---|---|---|---|---|---|---|---|
| Solution | 1 | 25.1 | $C_7$ 300 | $C'_4$ 40 | 3.5 | 20 | 140 | 90 |

TABLE 39

| | Properties | | |
|---|---|---|---|
| Density (g/cm³) | MI (g/10 min) | MFR | S.C.B. |
| 0.924 | 4 | 25 | 20 |

What is claimed is:

1. An ethylene-α-olefin copolymer composition excellent in transparency and strength and having a density of 0.915 to 0.929 g/cm³, a melt index of 0.02 to 50 g/10 min. and a melt flow ratio of 35 to 250, which comprises 10 to 70% by weight of an ethylene-α-olefin copolymer A and 90 to 30% by weight of an ethylene-α-olefin copolymer B; said copolymer A having a higher molecular weight than copolymer B and being a copolymer of ethylene and an α-olefin of 3 to 18 carbon atoms and having a density of 0.895 to 0.935 g/cm³, an intrinsic viscosity of 1.2 to 6.0 dl/g, the number of short chain branching per 1000 carbon atoms (hereinafter abbreviated as "S.C.B.") of 7 to 40 and a (weight average molecular weight)/(number average molecular weight) value of 2 to 10; said copolymer B being a copolymer of ethylene and an α-olefin of 3 to 18 carbon atoms and having a density of 0.910 to 0.955 g/cm³, an intrinsic viscosity of 0.3 to 1.5 dl/g, S.C.B. of 5 to 35 and a (weight average molecular weight)/(number average molecular weight) value of 2 to 10; said copolymer A and said copolymer B being selected in order to satisfy a condition that (S.C.B. of said copolymer A)/(S.C.B. of said copolymer B) is 0.6 to 1.7.

2. An ethylene-α-olefin copolymer composition according to claim 1, wherein at least one of said copolymer A and said copolymer B is an ethylene-butene-1 copolymer.

3. An ethylene-α-olefin copolymer composition according to claim 1, wherein at least one of said copolymer A and said copolymer B is an ethylene-4-methylpentene-1 copolymer.

4. An ethylene-α-olefin copolymer composition according to claim 1, wherein at least one of said copolymer A and said copolymer B is an ethylene-hexene-1 copolymer.

5. An ethylene-α-olefin copolymer composition according to claim 1, wherein at least one of said copolymer A and said copolymer B is an ethylene-octene-1 copolymer.

6. An extrusion processed material excellent in transparency and strength, obtained from an ethylene-α-olefin copolymer composition having a density of 0.915 to 0.929 g/cm³ and a melt index of 0.02 to 2.0 g/10 min. according to claim 1,2,3,4 or 5.

7. A film excellent in transparency and strength, obtained from an ethylene-α-olefin copolymer composition having a density of 0.915 to 0.929 g/cm³ and a melt index of 0.02 to 5 g/10 min. according to claim 1,2,3,4 or 5.

8. An injection molded material excellent in transparency and strength, obtained from an ethylene-α-olefin copolymer composition having a density of 0.915 to 0.929 g/cm³, a melt index of 2.0 to 50 g/10 min. and a melt flow ratio of 35 to 80 according to claim 1,2,3,4 or 5, which is obtained by mixing a copolymer A having an intrinsic viscosity of 1.2 to 4.0 dl/g and a copolymer B having a density of 0.910 to 0.950 g/cm³ and an intrinsic viscosity of 0.3 to 1.2 dl/g.

9. An ethylene-α-olefin copolymer composition according to claim 1,2,3,4 or 5, wherein said copolymer composition is prepared by a multi-stage polymerization.

10. An ethylene-α-olefin copolymer composition according to claim 1,2,3,4 or 5, characterized in that said copolymer components are mixed as a result of a two stage polymerization wherein, in the first stage, said copolymer A is polymerized under certain polymerization conditions for a certain length of time and successively, in the second stage, said copolymer B is polymerized with the first stage polymerization conditions changed other than catalysts until an intended weight ratio of copolymers A and B is obtained.

11. An extrusion processed material according to claim 6, characterized in that said ethylene-α-olefin copolymer composition is obtained as a result of a multi-stage polymerization.

12. A film according to claim 7 characterized in that said ethylene-α-olefin copolymer composition is obtained as a result of a multi-stage polymerization.

13. An injection molded material according to claim 8, characterized in that said ethylene-α-olefin copolymer composition is obtained as a result of a multi-stage polymerization.

14. A composition of copolymers of ethylene and an α-olefin of 3 to 18 carbon atoms, having first and second component groups, said first component group having a higher molecular weight than said second component group, having the following properties:
  (1) density of 0.915 to 0.929 g/cm$^3$,
  (2) intrinsic viscosity $[\eta]$ of 0.7 to 4.0 dl/g,
  (3) melt index of 0.02 to 50 g/10 min.,
  (4) S.C.B. being 5 to 45,
  (5) $[\eta]/[\eta]_l$ namely $g_\eta$* being at least 0.8, where $[\eta]_l$ is an intrinsic viscosity of a linear polyethylene having the same weight average molecular weight measured by a light scattering method,
  (6) (S.C.B. of the first component group)/(S.C.B. of the second component group) being 0.6 to 0.8 where the two component groups are prepared by consolidating fractions obtained by column fractionation in two portions of lower and higher molecular weight components, said portions being selected so that the weight ratio of the two portions corresponds to the weight ratio of lower and higher molecular weight components calculated from the gel permeation chromatography curve,
  (7) the second components have a density of 0.910 to 0.955 g/cm$^3$, an intrinsic viscosity of 0.3 to 1.5 dl/g and S.C.B. of 5 to 35,
  (8) the first components have a density of 0.895 to 0.935 g/cm$^3$, an intrinsic viscosity of 1.2 to 6.0 dl/g and S.C.B. of 7 to 40, and
  (9) the second components are 30 to 90% by weight and the first components are 70 to 10% by weight.

15. A copolymer composition according to claim 14 which gives at least a two-peak molecular weight distribution curve when subjected to gel permeation chromatography, in which curve the second component group contains at least one component having a peak chain length of $2 \times 10^2$ to $3.0 \times 10^3$ Å and the first component group contains at least one component having a peak chain length of $1 \times 10^3$ to $6 \times 10^4$ Å.

16. A copolymer composition according to claim 14, wherein said second components have S.C.B. of 5 to 35 and said first components have S.C.B. of 7 to 40.

17. A copolymer composition according to claim 14 which has a melt index of 0.04 to 10 g/10 min.

18. A copolymer composition according to claim 17 which has a melt flow ratio of 35 to 250.

19. A copolymer composition according to claim 18, wherein the α-olefin is butene-1.

20. A copolymer composition according to claim 18, wherein the α-olefin is 4-methylpentene-1.

21. A copolymer composition according to claim 18, wherein the α-olefin is hexene-1.

22. A copolymer composition according to claim 18, wherein the α-olefin is octene-1.

23. A copolymer composition according to claim 18 which is obtained from a multi-stage polymerization using a carrier-supported Ziegler catalyst.

* * * * *